US011171529B2

United States Patent
Klassen

(10) Patent No.: US 11,171,529 B2
(45) Date of Patent: Nov. 9, 2021

(54) INSERTS FOR CARRIERS FOR ELECTRIC MACHINES

(71) Applicant: GENESIS ROBOTICS AND MOTION TECHNOLOGIES CANADA, ULC, Langley (CA)

(72) Inventor: James Brent Klassen, Surrey (CA)

(73) Assignee: GENESIS ROBOTICS AND MOTION TECHNOLOGIES CANADA, ULC, Langley (CA)

( * ) Notice: Subject to any disclaimer, the term of this patent is extended or adjusted under 35 U.S.C. 154(b) by 64 days.

(21) Appl. No.: 16/618,107

(22) PCT Filed: May 31, 2018

(86) PCT No.: PCT/CA2018/050649
§ 371 (c)(1),
(2) Date: Nov. 28, 2019

(87) PCT Pub. No.: WO2018/218366
PCT Pub. Date: Dec. 6, 2018

(65) Prior Publication Data
US 2020/0112219 A1    Apr. 9, 2020

Related U.S. Application Data

(60) Provisional application No. 62/551,774, filed on Aug. 29, 2017, provisional application No. 62/550,680, (Continued)

(51) Int. Cl.
*H02K 3/42* (2006.01)
*H02K 1/14* (2006.01)
(Continued)

(52) U.S. Cl.
CPC .............. *H02K 3/42* (2013.01); *H02K 1/146* (2013.01); *H02K 7/088* (2013.01); *H02K 15/022* (2013.01); *H02K 21/24* (2013.01)

(58) Field of Classification Search
CPC .......... H02K 1/146; H02K 3/42; H02K 7/088; H02K 15/022; H02K 16/00; H02K 16/02; H02K 16/04; H02K 21/24
(Continued)

(56) References Cited

U.S. PATENT DOCUMENTS 3,176,809 A    4/1965   Monroe
3,277,357 A   10/1966   Willis
(Continued)

FOREIGN PATENT DOCUMENTS

CN    102832739 A    12/2012
DE    10229333 A1     1/2004
(Continued)

OTHER PUBLICATIONS

European Extended Search Report received for EP Application No. 18809222.5, dated Oct. 13, 2020, 8 Pages.
(Continued)

*Primary Examiner* — Tulsidas C Patel
*Assistant Examiner* — Rashad H Johnson

(57) ABSTRACT

A carrier for an electric machine has a first layer and plural first posts extending from the first layer. The first layer defines gaps through the first layer adjacent to the plural first posts. One or more inserts have insert posts configured to be inserted through the gaps to combine with the plural first posts to widen the plural first posts. A carrier may also have a first layer, plural first posts extending from the first layer, the first layer defining gaps through the first layer intermediate between successive posts of the plural posts. One or more inserts have insert posts configured to be inserted
(Continued)

through the gaps to form an array of posts in combination with the plural first posts.

19 Claims, 44 Drawing Sheets

Related U.S. Application Data filed on Aug. 27, 2017, provisional application No. 62/513,432, filed on May 31, 2017, provisional application No. 62/513,415, filed on May 31, 2017.

(51) Int. Cl.
  *H02K 7/08* (2006.01)
  *H02K 15/02* (2006.01)
  *H02K 21/24* (2006.01)

(58) Field of Classification Search
  USPC ............ 310/154.05, 154.37, 156.32, 156.33,
      310/216.004, 216.008, 216.011, 216.015,
          310/216.016, 216.057
  See application file for complete search history.

(56) References Cited

U.S. PATENT DOCUMENTS

| | | | |
|---|---|---|---|
| 3,548,985 A | 12/1970 | Espenschied et al. | |
| 3,734,245 A | 5/1973 | Hubbard | |
| 5,250,921 A | 10/1993 | Van et al. | |
| 5,490,583 A | 2/1996 | Anderson | |
| 6,594,111 B1 | 7/2003 | Oveyssi et al. | |
| 7,173,357 B2* | 2/2007 | Naito | H02K 1/148 |
| | | | 310/154.05 |
| 9,755,463 B2 | 9/2017 | Klassen et al. | |
| 2002/0140312 A1 | 10/2002 | Ikeda et al. | |
| 2004/0084989 A1 | 5/2004 | Schunk et al. | |
| 2006/0028093 A1* | 2/2006 | Minagawa | H02K 1/148 |
| | | | 310/268 |
| 2011/0037335 A1* | 2/2011 | Jang | H02K 1/148 |
| | | | 310/156.32 |
| 2013/0186726 A1 | 7/2013 | Collins | |
| 2014/0042851 A1 | 2/2014 | Takemoto et al. | |
| 2015/0244214 A1* | 8/2015 | Kreidler | B22F 7/06 |
| | | | 310/216.065 |
| 2016/0164351 A1 | 6/2016 | Weiske | |
| 2017/0047792 A1* | 2/2017 | Klassen | H02K 1/274 |

FOREIGN PATENT DOCUMENTS

| | | |
|---|---|---|
| DE | 102015213908 A1 | 1/2017 |
| EP | 0145837 A2 | 6/1985 |
| JP | 2006-353054 A | 12/2006 |
| JP | 2009103212 A | 5/2009 |
| WO | 2005/095819 A1 | 10/2005 |
| WO | 2017/015464 A1 | 1/2017 |
| WO | 2018/218366 A1 | 12/2018 |
| WO | 2018/218367 A1 | 12/2018 |

OTHER PUBLICATIONS

Notification of Reasons for Refusal received for JP application No. 2020-515793, dated Dec. 7, 2020, 10 pages. (6 pages of English translation and 4 pages of official copy).

Notification of Reasons for Refusal received for KR application No. 10-2019-7036434, dated Nov. 25, 2020, 14 pages. (7 pages of English translation and 7 pages of official copy).

International Search Report and Written Opinion received for PCT application No. PCT/CA2018/050651, dated Aug. 31, 2018, 7 pages.

International Search Report and Written Opinion received for PCT application No. PCT/CA2018/050649, dated Sep. 13, 2018, 8 pages.

Extended European Search Report received for EP application No. 18808727.4, dated Jan. 14, 2021, 9 pages.

Non Final Office Action received for U.S. Appl. No. 16/617,502, dated May 12, 2021, 10 pages.

* cited by examiner

INSERTS FOR CARRIERS FOR ELECTRIC MACHINES

This application claims priority to PCT Application No. PCT/CA2018/050649, filed on May 31, 2018, which claims the benefit of U.S. Provisional Application No. 62/513,415, filed on May 31, 2017, 62/513,432 filed on May 31, 2017, 62/550,680 filed on Aug. 27, 2017, and 62/551,774 filed on Aug. 29, 2017, which are incorporated herein by reference in their entirety.

TECHNICAL FIELD

Carriers for electric machines.

BACKGROUND

Laminates are used in a typical stator to reduce eddy current generation by reducing the thickness of the flux path from post to post. Laminated structures for an axial flux or similar construction electrical machine stator are typically difficult to form and assemble.

It is desirable to use a solid and preferably monolithic material for an electric machine stator to achieve high flux density and high strength along with low cost and high precision, but a solid, monolithic material such as steel or iron will produce higher eddy currents than a stator made of an assembly of thinner laminates.

In a concentrated winding configuration there can be a coil around every second post. The posts that are not being wound can restrict the space available for winding mechanisms such as needles.

SUMMARY

There is provided a carrier for an electric motor, the carrier having one or more layers forming plural posts. An additional layer has plural post portions formed as a single piece, and defining gaps between the plural post portions. The plural posts are inserted into the gaps between the plural post portions to widen the plural posts in combination with the plural post portions.

In various embodiments, there may be included any one or more of the following features: the additional layer may comprise L-shaped portions, the plural post portions being formed as upright portions of the L-shaped portions, the gaps between the plural post portions being defined by the L-shaped portions. The one or more layers may be plural layers themselves forming a carrier as described above. One of the one or more layers may be a base layer having plural base post portions formed as a single piece. The layers may be spaced, for example there may be spacers arranged between the layers or the layers may be shaped to form spaces between adjacent layers when assembled. The gaps defined by each layer may be sized substantially to match the posts inserted into the gaps.

There is provided a method of forming a carrier as described above, by forming the layers by one or more of machining from billet, casting, powdered or injection molded metal processes.

There is provided a method of forming a carrier as described above, by providing one or more layers forming plural posts, providing a sheet of metal to form an additional layer as a single piece. forming flaps and corresponding gaps in the sheet of metal. bending the flaps in the sheet of metal to form plural post portions, and inserting the posts into the gaps adjacent to the plural post portions so that the plural post portions widen the posts.

The one or more layers may be a base layer having plural posts formed as a single piece, by providing a base sheet of metal to form the base layer, forming flaps in the base sheet of metal, and bending the flaps in the base sheet of metal to form the plural posts.

There is also provided a carrier for an electric machine, the carrier having a first layer, plural first posts extending from the first layer, the first layer defining gaps through the first layer adjacent to the plural first posts, and one or more inserts having insert posts configured to be inserted through the gaps to combine with the plural first posts to widen the plural first posts.

There is also provided a carrier for an electric machine, the carrier having a first layer and one or more inserts, plural first posts extending from the first layer, the first layer defining gaps through the first layer intermediate between successive posts of the plural posts, and the one or more inserts having insert posts configured to be inserted through the gaps to form an array of posts in combination with the plural first posts.

There is also provided a carrier for an electric machine, the carrier comprising a first layer, one or more first inserts and one or more second inserts, plural first posts extending from the first layer, the first layer defining first gaps through the first layer adjacent to the plural first posts and defining second gaps through the first layer intermediate between successive posts of the plural first posts, the one or more first inserts having first insert posts configured to be inserted through the first gaps to combine with the plural first posts to widen the plural first posts, and the one or more second inserts having second insert posts configured to be inserted through the second gaps to form an array of posts in combination with the plural first posts as widened by the one or more first inserts.

In various embodiments, there may be included any one or more of the following features: the one or more second inserts may be plural second inserts, and plural second insert posts may be configured to be inserted into each of the second gaps to form the array of posts in combination with the plural first posts as widened by the one or more first inserts. The one or more first inserts may be a single insert having third gaps, and the plural second insert posts may be configured to be inserted through the second gaps and third gaps.

There is provided a method of assembling a carrier for an electric machine, by providing a first layer, plural first posts extending from the first layer, the first layer defining gaps through the first layer intermediate between successive posts of the plural posts, providing a respective conductor coil around each of the plural first posts; providing one or more inserts having insert posts configured to be inserted through the gaps, and inserting the insert posts through the gaps to form an array of posts in combination with the plural first posts. The respective conductor coil may be provided around each of the plural first posts by any method, for example winding with a needle.

There is provided a method of assembling a carrier for an electric machine, by providing a first layer, plural first posts extending from the first layer, the first layer defining first gaps through the first layer adjacent to the plural first posts and defining second gaps through the first layer intermediate between successive posts of the plural first posts, providing one or more first inserts having first insert posts configured to be inserted through the first gaps, inserting the first insert posts through the first gaps to combine with the plural first posts to widen the plural first posts, providing a respective conductor coil around each of the plural first posts, as widened by the one or more first inserts; providing one or more second inserts having second insert posts configured to be inserted through the second gaps to form an array of posts in combination with the plural first posts as widened by the one or more first inserts, and inserting the second insert posts through the second gaps to form an array of posts in combination with the plural first posts as widened by the one or more first inserts.

In various embodiments, there may be included any one or more of the following features: the one or more second inserts may be plural second inserts, and in the step of inserting the second insert posts through the second gaps plural second insert posts may be inserted into each of the second gaps. The one or more first inserts may be a single insert having third gaps, and in the step of inserting the second insert posts through the second gaps the plural second insert posts may be inserted through the second gaps and third gaps. The respective conductor coil may be provided around each of the plural first posts, as widened by the one or more first inserts, for example by winding with a needle.

These and other aspects of the device and method are set out in the claims.

BRIEF DESCRIPTION OF THE FIGURES

Embodiments will now be described with reference to the figures, in which like reference characters denote like elements, by way of example, and in which.

DETAILED DESCRIPTION

Immaterial modifications may be made to the embodiments described here without departing from what is covered by the claims.

A solid iron or steel alloy core stator for an electrical machine has the advantages of high strength and stiffness but higher speeds are limited by eddy current production. Embodiments of the device shown here allow the posts and backiron to be made from a solid monolithic material while at the same time reducing eddy currents. Other advantages of this construction include the possibility of faster machining by virtue of the ability to use larger cutters as a result of a larger gap between post sections on each stator component before final assembly.

Note that similar construction can also be used in electric machine rotors such as with flux amplification rotors (or travelers) to reduce eddy currents.

Many types of materials may be used such as iron or electrical steel.

Figure 1:
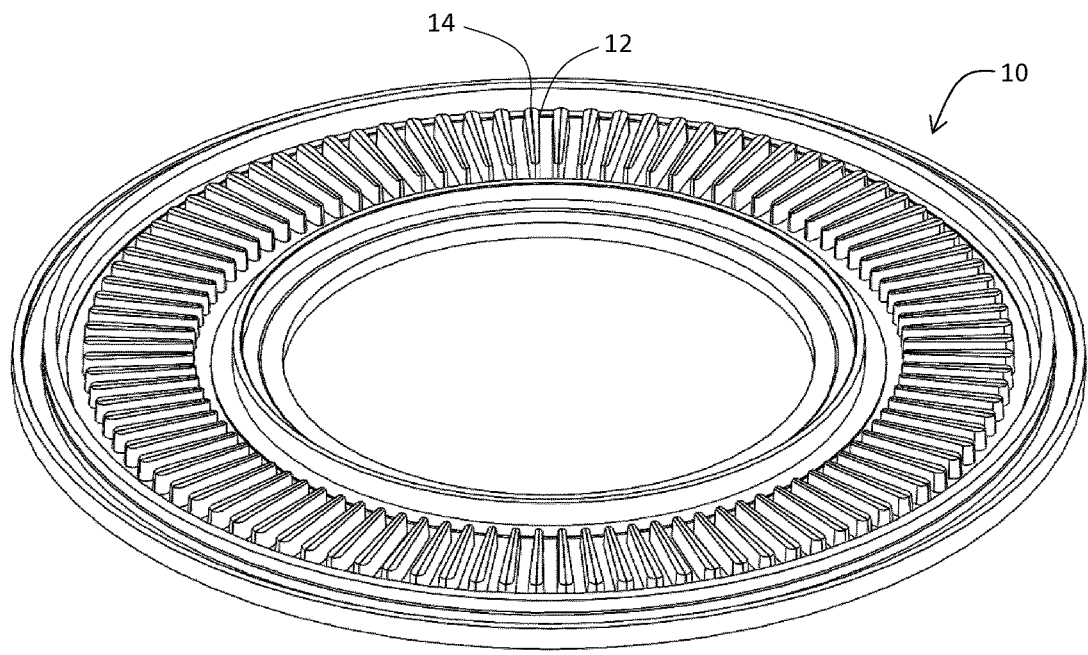
FIG. 1 is an isometric view of an exemplary stator with an insert.

FIG. 1 shows an assembled exemplary axial flux stator 10. No windings, bearings or rotor are shown in FIG. 1. The exemplary stator has posts 12, each having a split 14 down the middle to reduce eddy currents. There are a large number of posts 12. Depending on the wiring arrangement, each post might correspond to a pole. It should be noted that higher or lower numbers of posts and pole counts can be used with this construction.

Figure 2:
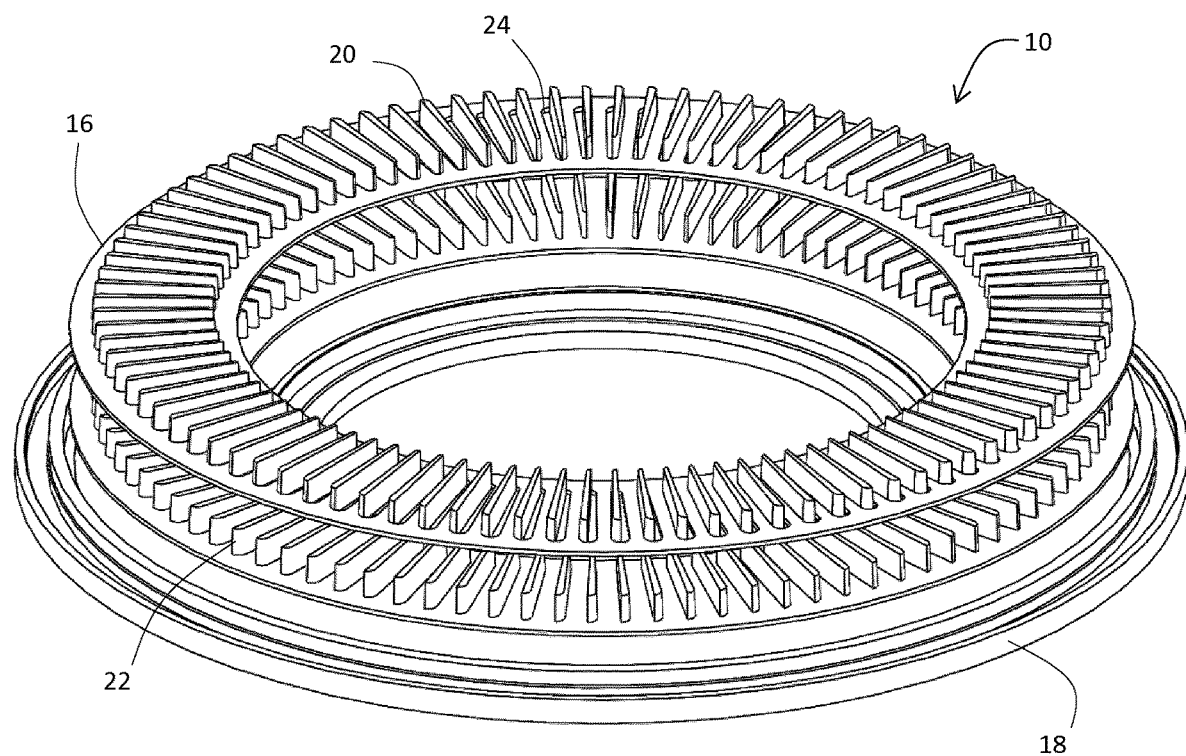
FIG. 2 is an exploded isometric view of the stator of FIG. 1.

FIG. 2 shows an exploded view of the exemplary device in FIG. 1. As can be seen in FIG. 2, exemplary stator 10 is formed of two layers, an inner (top) layer 16 and an outer (bottom, base) layer 18. The split 14 of each post 12 as shown in FIG. 1 can be seen to divide each post into an inner layer post portion 20 connected to and formed as one piece with the inner layer and an outer layer post 22 connected to and formed as one piece with the outer layer. The inner layer 16 has gaps 24 adjacent to the inner layer post portions 20 so that the outer layer posts 22 can be inserted into the gaps 24 to widen the outer layer posts 22 in combination with the inner layer post portions 20 to form the posts 12.

The inner layer 16 including all inner layer post portions 20 is formed as a single piece, and the outer layer 18 including all outer layer posts 22 are formed as a single piece. As shown, the gaps 24 adjacent to each inner layer post portion 20 are all in the same circumferential direction from the corresponding inner layer post portion 20, but they could also be in different directions, with the outer layer posts 22 adjusted in position correspondingly.

Figure 3:
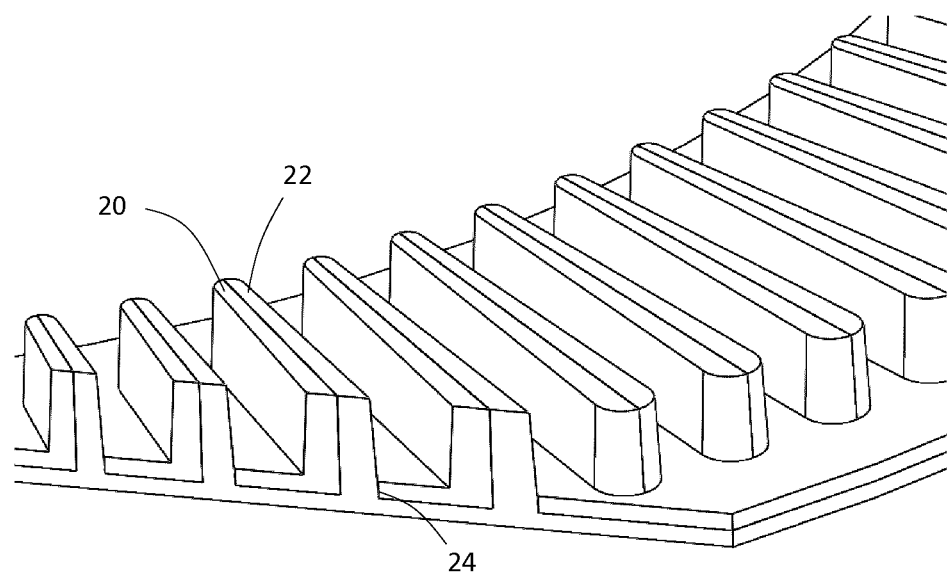
FIG. 3 is a closeup cutaway view of an assembled stator insert assembly of FIG. 1, without radially inner and outer housings.

FIG. 3 shows a closeup section view of an assembled stator insert assembly. The stator assembly uses layers forming posts similar to those in the embodiment of FIGS. 1-2. The two piece construction is clearly visible here. In cross section, the inner layer post portions 20 in combination with adjacent portions of the inner layer 16 form L shapes in this embodiment where the gaps 24 are all to the same circumferential direction of the corresponding inner layer post portion 20. Where the gaps 24 are not all in the same circumferential direction, some inner layer post portions 20 could be connected in U shapes and there could also be others forming single stroke I shapes. Gaps 24 here are filled with the inserted outer layer posts 22.

Figure 4:
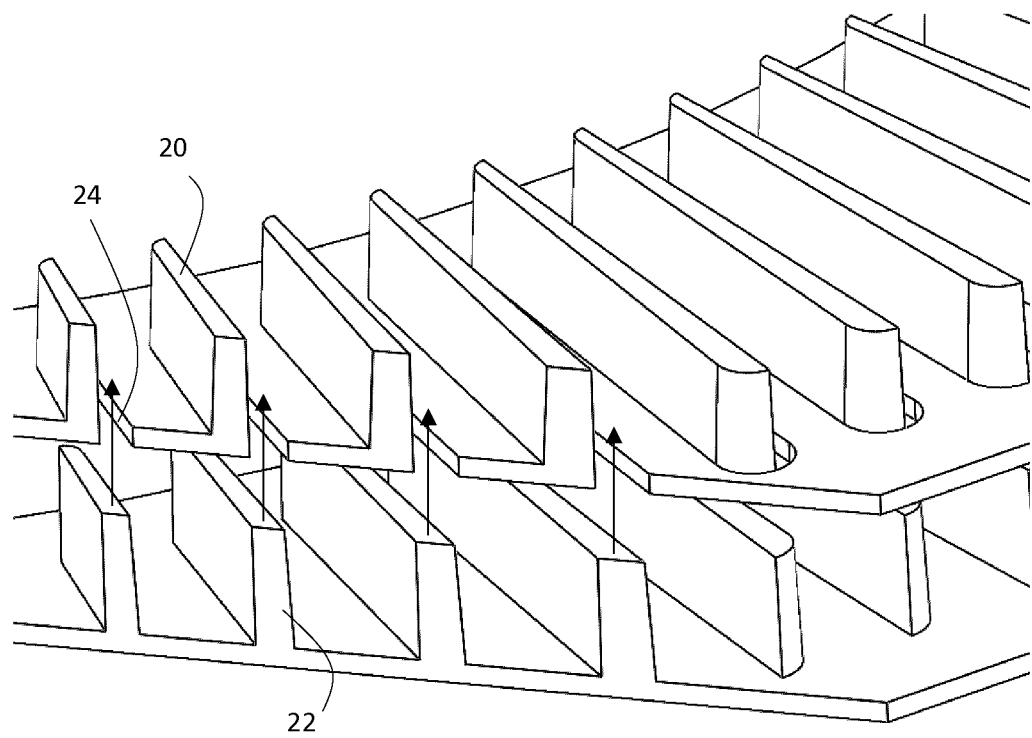
FIG. 4 is an exploded view of the stator insert assembly of FIG. 3.

FIG. 4 is an exploded view of the stator insert assembly in FIG. 3 showing the slots 24 beside the post portions 20 of the inner stator layer which allow the post halves 22 on the outer layer to be inserted together to form any post geometry from solid material but with reduced eddy currents as a result of a thinner flux path cross section in any one solid piece from the tip of each post to the tip of adjacent post/s.

Figure 5:
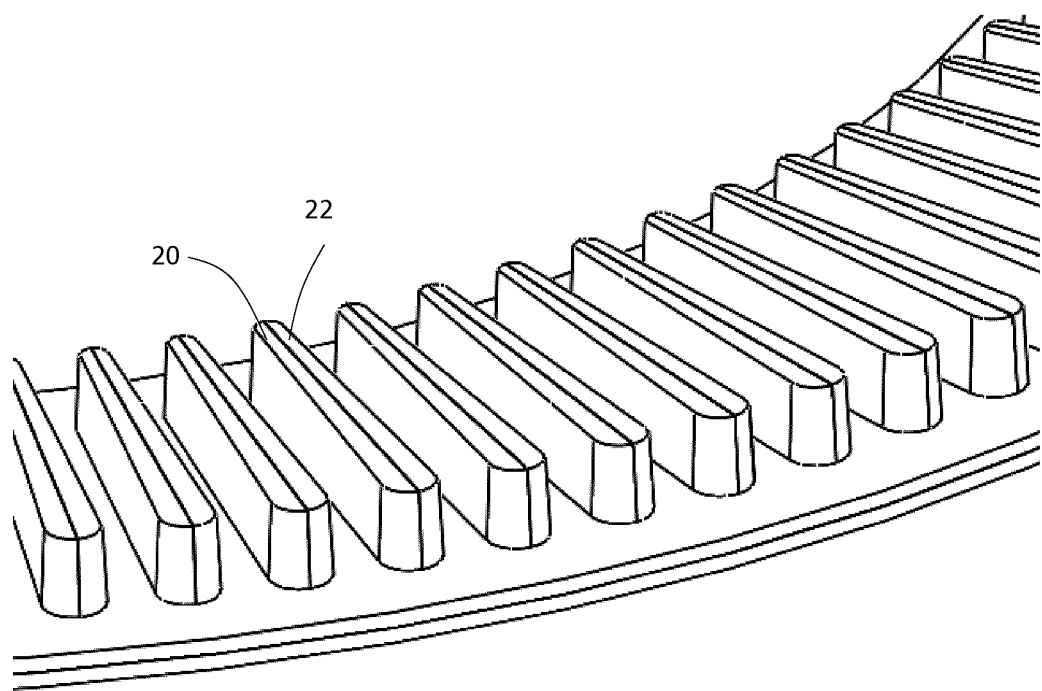
FIG. 5 is a close-up view of the assembled two-part stator of FIG. 3.

FIG. 5 is a close-up view of the assembled two-part stator of the embodiment of FIG. 3.

Figure 6:
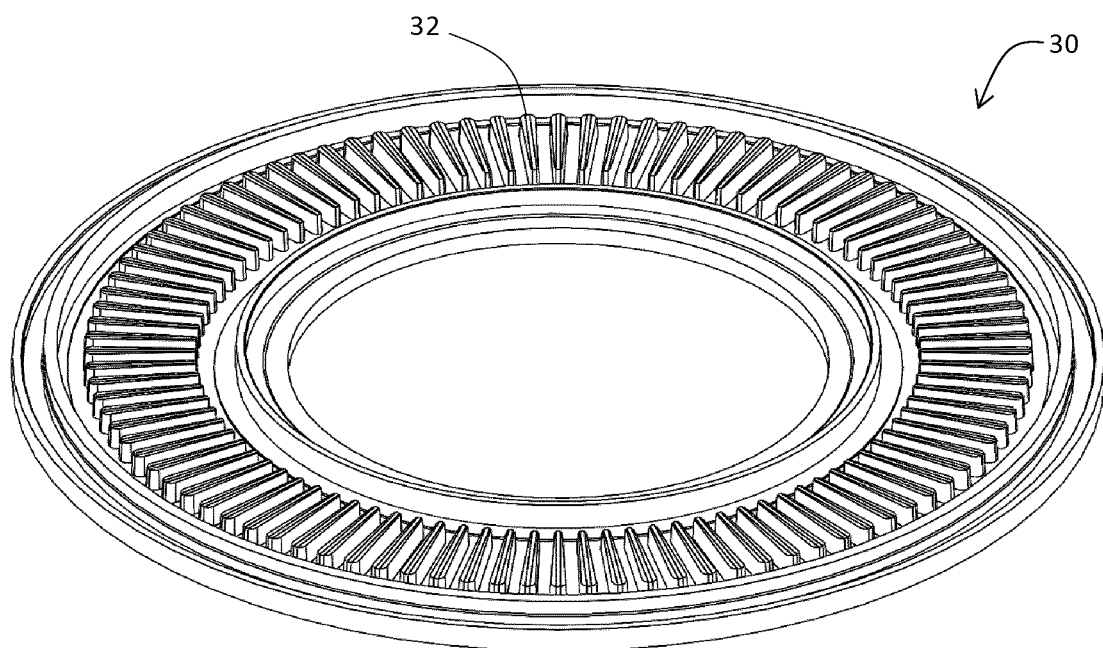
FIG. 6 is an isometric view of an exemplary embodiment of a three layer stator.
Figure 7:
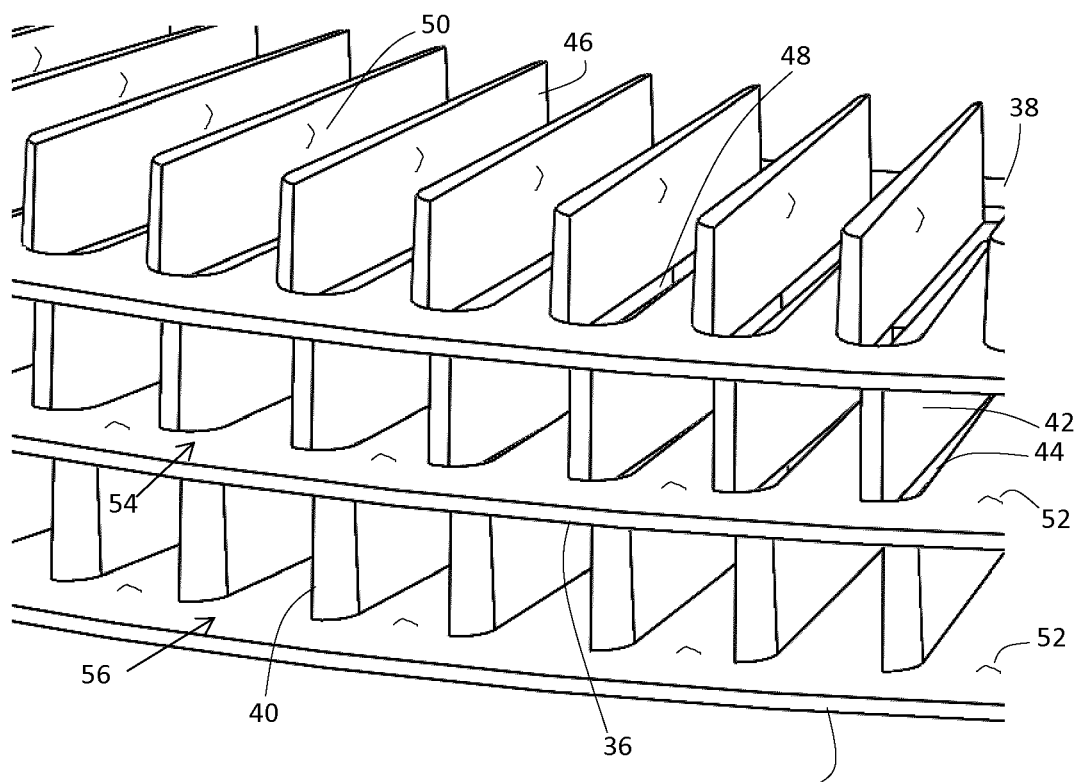
FIG. 7 is an exploded view of the three layers of the stator of FIG. 6.

FIG. 6 shows an exemplary embodiment of a three layer stator 30 having posts 32, the stator being similar in design to the two layer stators 10 shown in FIGS. 1-5. More than three layers can also be used. The lower the pole count, the more advantageous it will be to use greater than three stator layers. The layers are better shown in FIG. 7, which shows an exploded view of the exemplary stator insert embodiment of FIG. 6. As can be seen in FIG. 7, the stator 30 includes an outer layer 34, a first inner layer 36, and a second inner layer 38. The outer layer 34 has outer layer posts 40. The first inner layer 36 has first inner layer post portions 42 and first gaps 44 for receiving the outer layer posts 40. The second inner layer 38 has second inner layer post portions 46 and second gaps 48 for receiving the outer layer posts 40 and the first inner layer post portions 42. The first gaps 44 adjacent to the first inner layer post portions 42 allow the outer layer posts 40 to be inserted into the first gaps 44 to widen the outer layer posts 40 in combination with the inner layer post portions 42. These widened outer layer posts can in turn be inserted into second gaps 48 to widen the outer layer posts to form posts 32. This process of inserting successively wider posts into gaps of additional layers can be extended to an arbitrary number of layers. Bumps 50 on the sides of post portions and bumps 52 on planar surfaces 54 and 56 help separate the layers to reduce conduction between layers.

Figure 8:
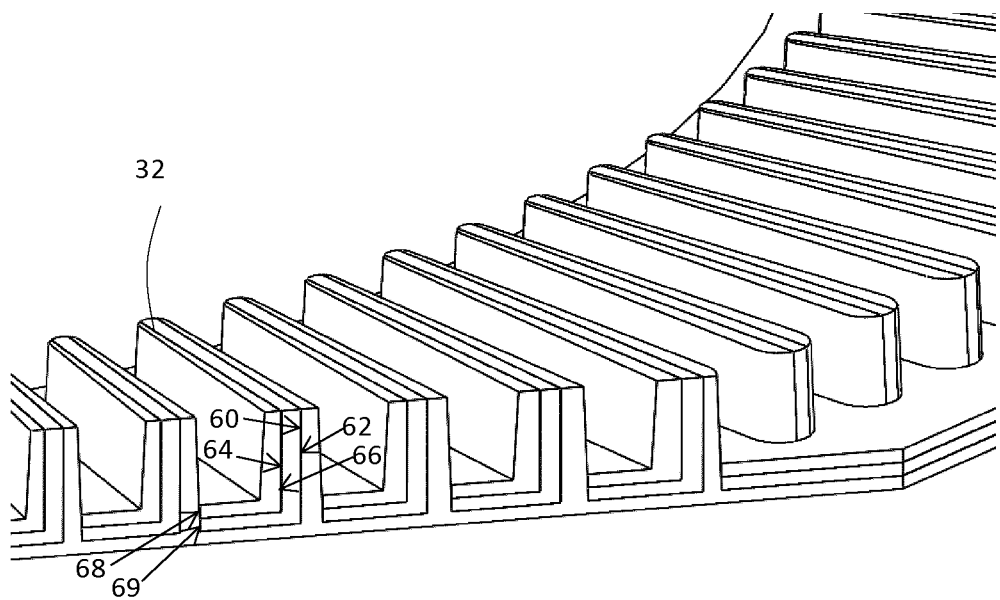
FIG. 8 is a cutaway view of the three layers of the stator of FIG. 6.

FIG. 8 is a section view of the assembled exemplary embodiment of FIG. 7. The laminate-like construction is clearly visible here. It should be noted that the flux path of the outermost section is uninterrupted from post to post. The flux path of the middle and inner stator section includes a seam between the components that is preferably as small as practical for a given manufacturing process. One way to achieve this is to have a controllable or adjustable gap between the surface 60 of the outer layer and the corresponding surface 62 of the first inner layer. Likewise, a controllable gap may be implemented between the opposite surface 64 of the first inner layer and the corresponding surface 66 of the second inner layer inner. This gap may be provided by a number of methods such as spacers or coatings or bumps (as is visible on the inner surface 66 and the planar surfaces 54 and 56 in FIG. 7) or ridges on the surfaces 60, 62, 64 and 66 which provide a slight gap between the surfaces such that the flux path seam at edges 68 and 69 of the gaps in the inner layers has a minimized airgap. If bumps are used, as shown in FIG. 7, the individual stator pieces may not need to be powder coated or otherwise electrically insulated before assembly. The ideal thickness of the gaps between surfaces 60, 62, 64 and 66 and also between the planar surfaces 54 and 56 is determined by the max voltage of the eddy currents and the dielectric properties of the potting compound used during the final assembly between the layers. The parts may be assembled with no potting compound in which case the gaps between layers may also be used for airflow for cooling.

Figure 9:
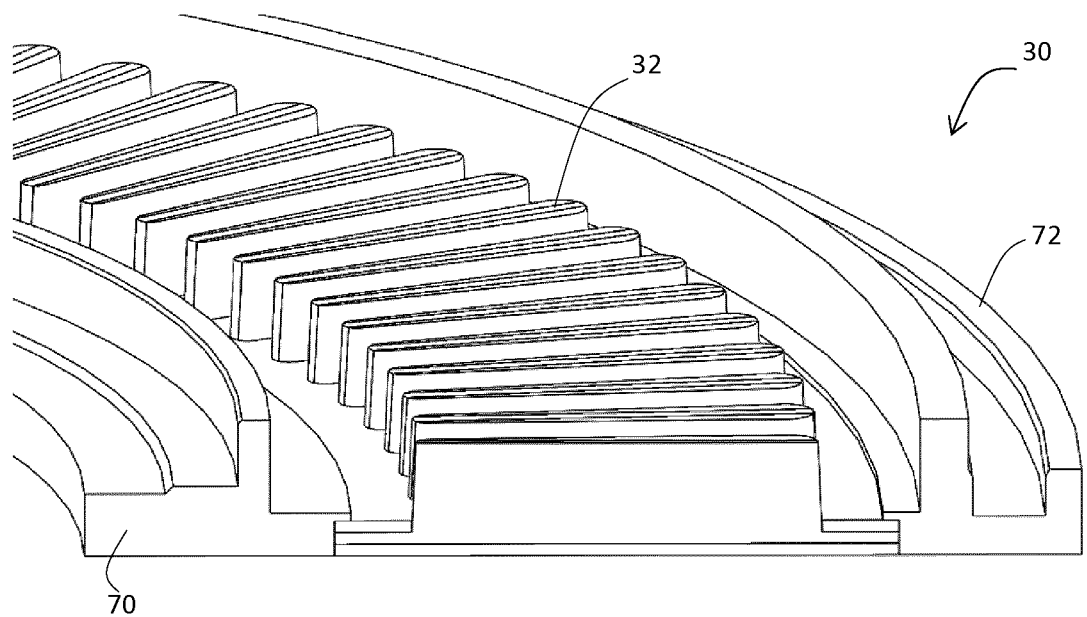
FIG. 9 is a cutaway view of the stator of FIG. 6 showing radially inner and outer housings.

FIG. 9 shows a cross section of the three section stator insert in FIG. 8 with an inner housing 70 and outer housing 72 which can be made of many different materials such as aluminum or magnesium or a composite etc.

Figure 10:
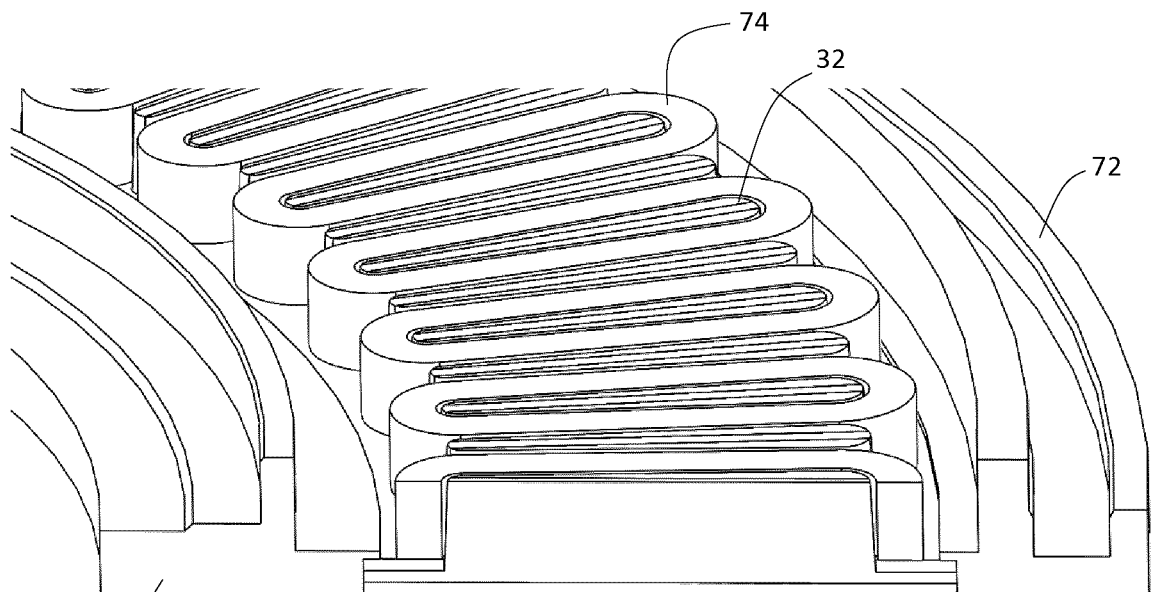
FIG. 10 is a cutaway view of the stator of FIG. 6 with coils added.
Figure 11:
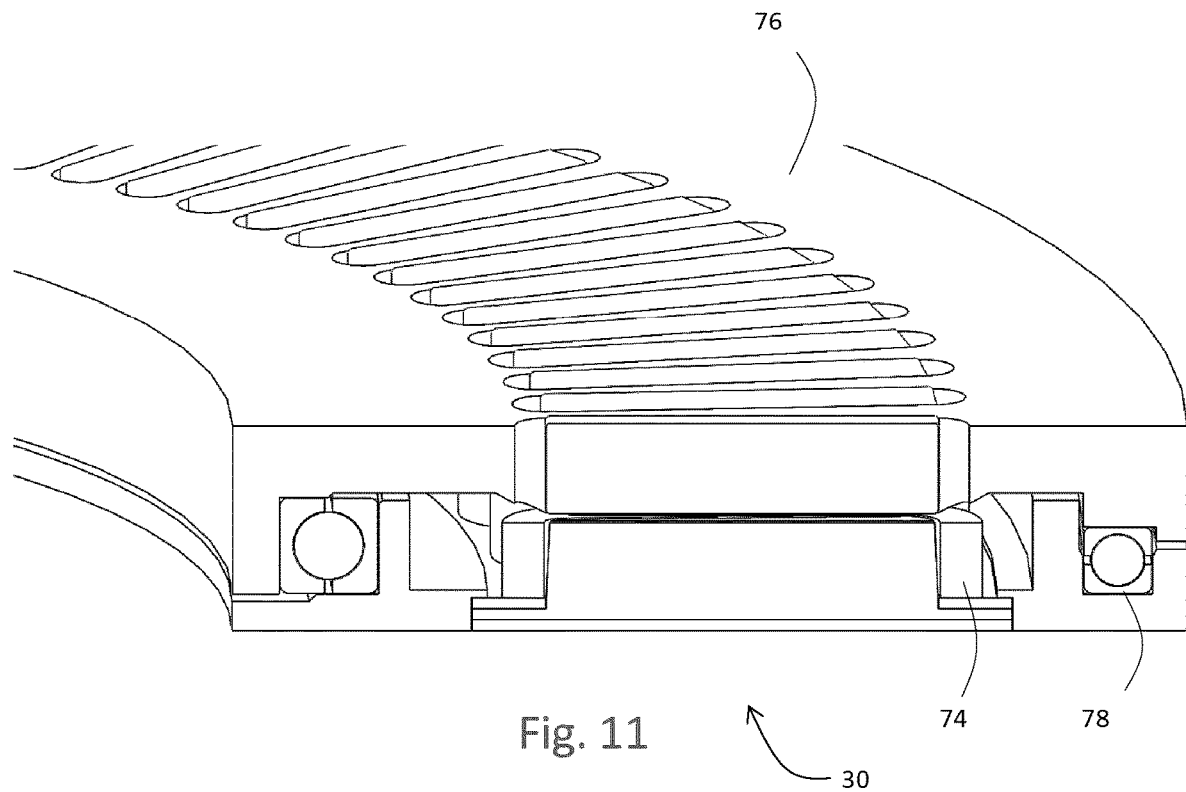
FIG. 11 is a cutaway view of an electric motor including the stator of FIG. 6.
Figure 12:
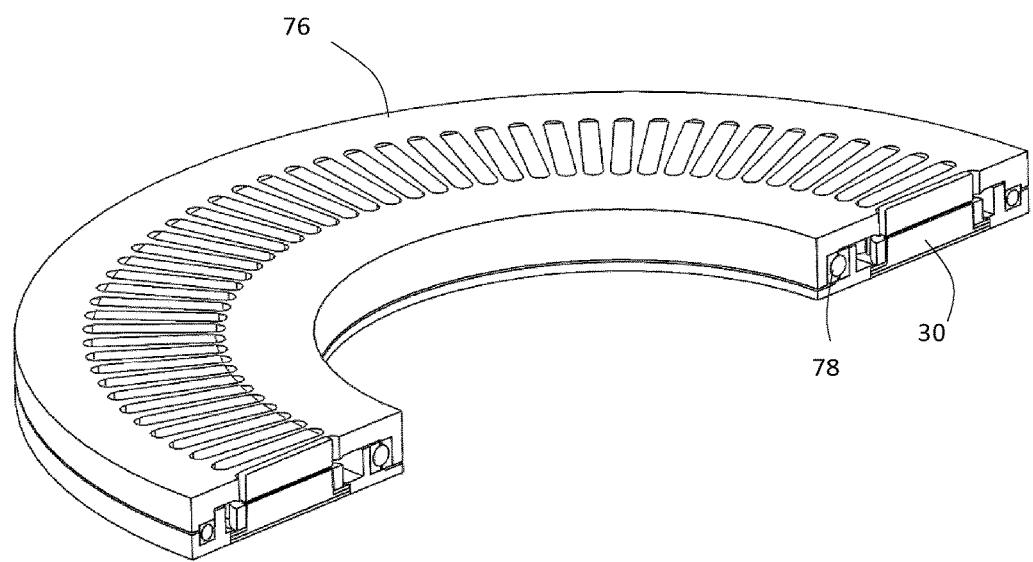
FIG. 12 is a different cutaway view of the electric motor of FIG. 11.
Figure 13:
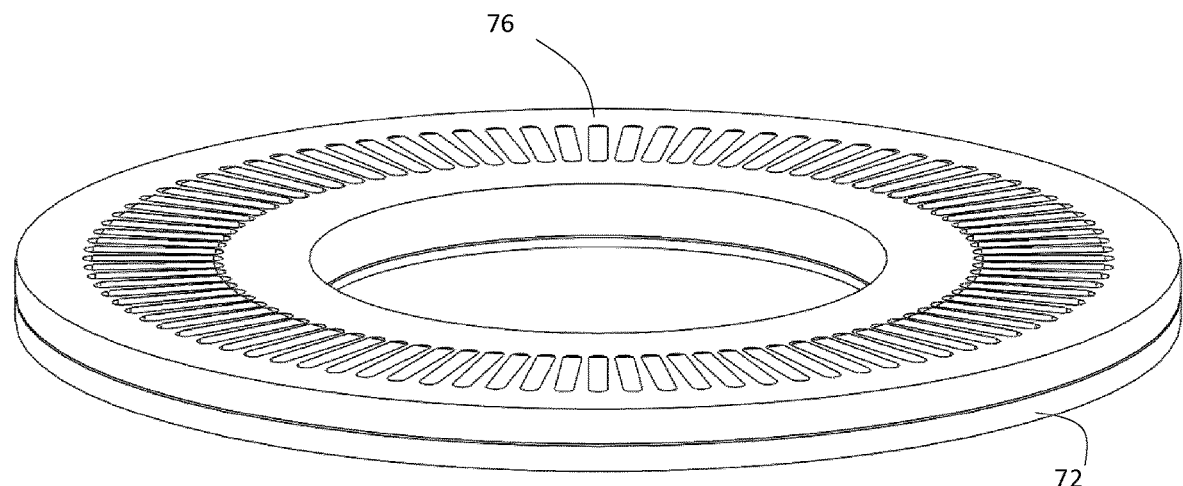
FIG. 13 is an isometric view of the electric motor of FIG. 11.
Figure 14:
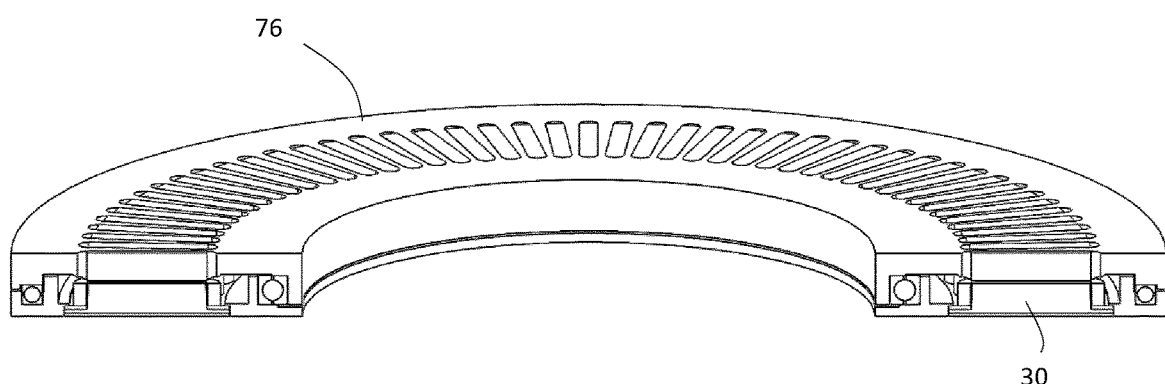
FIG. 14 is a further cutaway view of the electric motor of FIG. 11.

FIG. 10 shows the stator assembly of FIG. 9 with schematic windings 74.

FIGS. 11-14 show the exemplary device of FIG. 10 in an exemplary assembly with a rotor 76 and bearings 78.

Fabrication of the stator sections can be by machining from billet, casting, powdered or injection molded metal processes, or a combination of these etc.

Though shown as a stator the same structure could be used as a rotor, or as a moving or stationary carrier of a linear motor. A carrier is a generic term for a stator or rotor, or for their linear equivalents.

The base layer 34 of the layers in the embodiment shown in the figures has no gaps between post portions. This may be useful for strength and improved flux path between posts. The term "base" refers to position relative to the other layers shown and described. It need not imply the nonexistence of other components further in the direction of the base layer relative to the other layers. For convenience this direction may be referred to as "down", and relative position in this direction as "below". This direction is generally in a direction away from an airgap of the motor, as the posts are preferably connected by flux paths away from the airgap, but not near the airgap, to encourage flux to connect across the airgap. In an example embodiment the base layer may have post portions on both sides with further layers on both sides side to form a stator for a motor with the stator disposed between two rotors. In this case, the base layer forms a middle portion "below" the other layers on each side.

Additional layers may be applied treating the more baseward layers collectively as a base layer. In this way an arbitrary number of layers may be applied, as long as sufficient space is available. Although in FIGS. 7-10 the additional layers are arranged such that the sequential layers form a sequential arrangement of post portions, the post portions could be arranged differently, e.g. sequential layers could have post portions on opposite sides of the more baseward post portions.

The post portions as shown are, in the non-base layers, part of L-shaped portions in these embodiments shown where the gaps are to one direction of the respective post portions. The L shape permits greater strength than a post portion not part of such an L-shaped portion would have. Although the L-shaped portions are shown arranged in the same direction for plural additional layers in FIGS. 7-10, they could also differ in direction. The embodiment in which the L-shaped portions have the same direction has the advantage that the lower portions of the L-shaped portions may rest on one another, and further end-iron portions of the layers may also rest on one another, such that the lower portions of the L-shaped portions are coplanar with the end-iron portions. In an embodiment, some but not all the layers could have post portions being part of L-shaped portions.

By forming plural post portions of a layer as a single piece, greater strength is obtained while still allowing each post to comprise multiple layers to reduce eddy currents. In the embodiments shown, the single pieces extend fully around the carrier, but in other embodiments plural single pieces could each extend only a portion of the length of the carrier.

The gaps defined by each layer may be sized substantially to match the post portions inserted into the gaps. This sizing may improve strength of the carrier and flux transfer between posts.

Radially Punched and Bent Laminate Posts

The layers may in some embodiments be formed from metal sheets. Flaps may be formed in the metal sheets, e.g. by punching or cutting, and the flaps bent to form the post portions. The gaps between post portions may be the areas of the metal sheets from which the flaps were formed.

Embodiments of the device disclosed here provide a simple and robust manufacturing method for a laminated structure that provides high strength and stiffness as well as high speed capability as a result of the ability to use, for example, laminated electrical steel.

Figure 15:
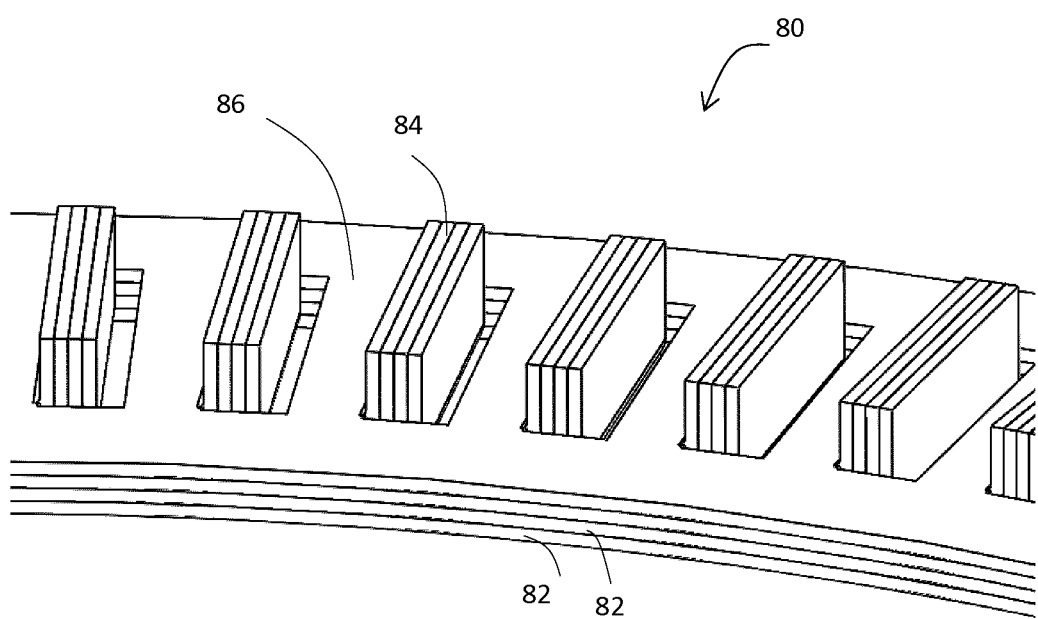
FIG. 15 is an isometric view of a portion of an exemplary stator with post portions formed as flaps.

FIG. 15 shows an exemplary embodiment of an assembled stator insert 80 made of 4 separately fabricated layers 82 which can each be made from a laminated soft magnetic material. Greater or lesser than seven laminates may be used. Assembly of the separate layers 82 together results in a stator and backiron 86 with desirable electromagnetic and structural characteristics. The ability to punch the individual layers has potential cost benefits as well.

Figure 16:
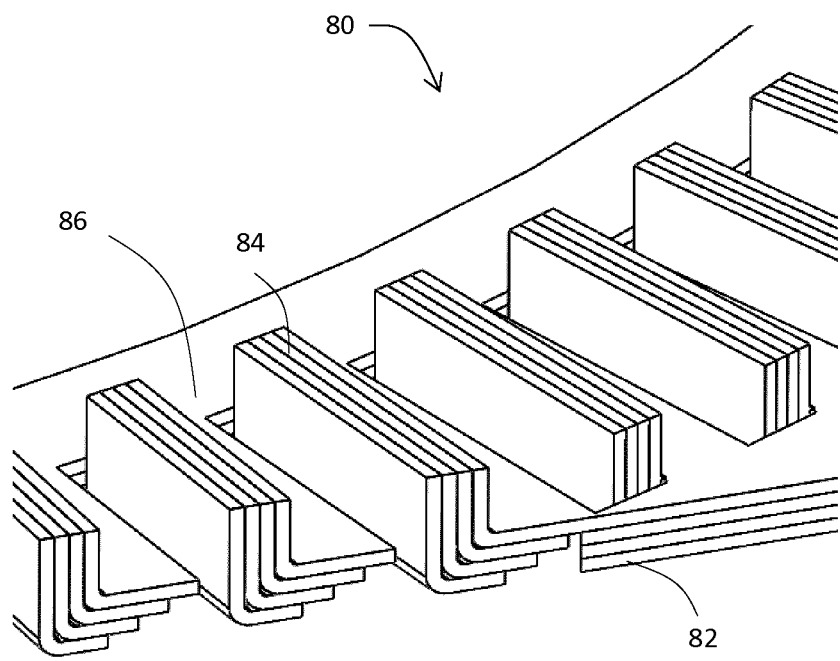
FIG. 16 is a cutaway view of the stator of FIG. 15.

FIG. 16 shows a cross section of the different layers 82 which nest together to create the posts 84 and backiron 86 of the stator insert 80.

Figure 17:
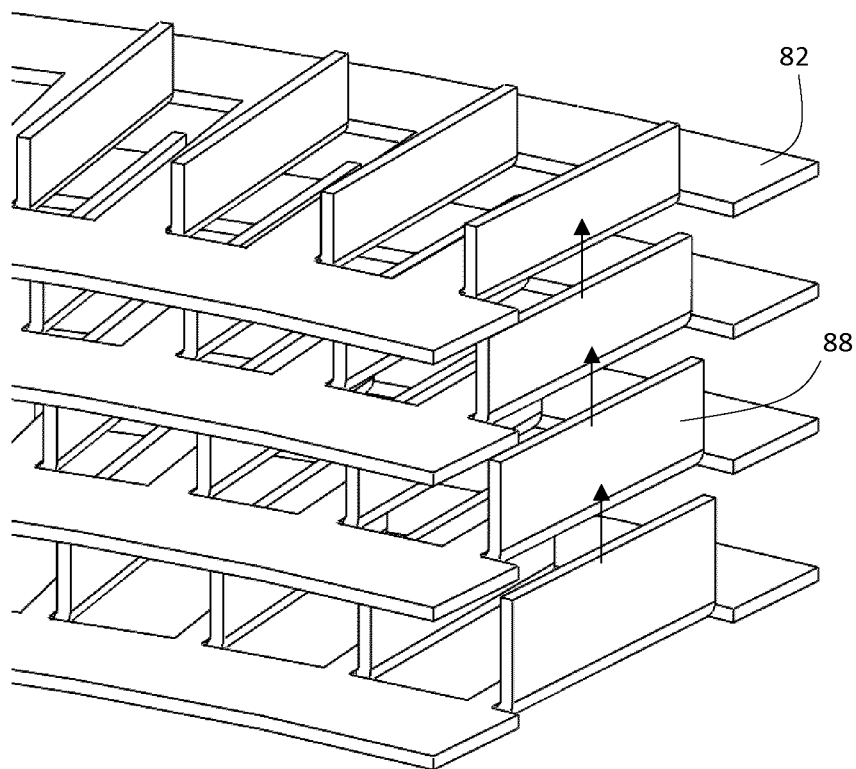
FIG. 17 is an exploded view of the stator of FIG. 15.

FIG. 17 shows an exploded view of the exemplary assembly in FIG. 16. The post portions 88 may increase in length from the innermost layer to the outermost layer in order that the final posts have a generally flat top surface.

Figure 18:
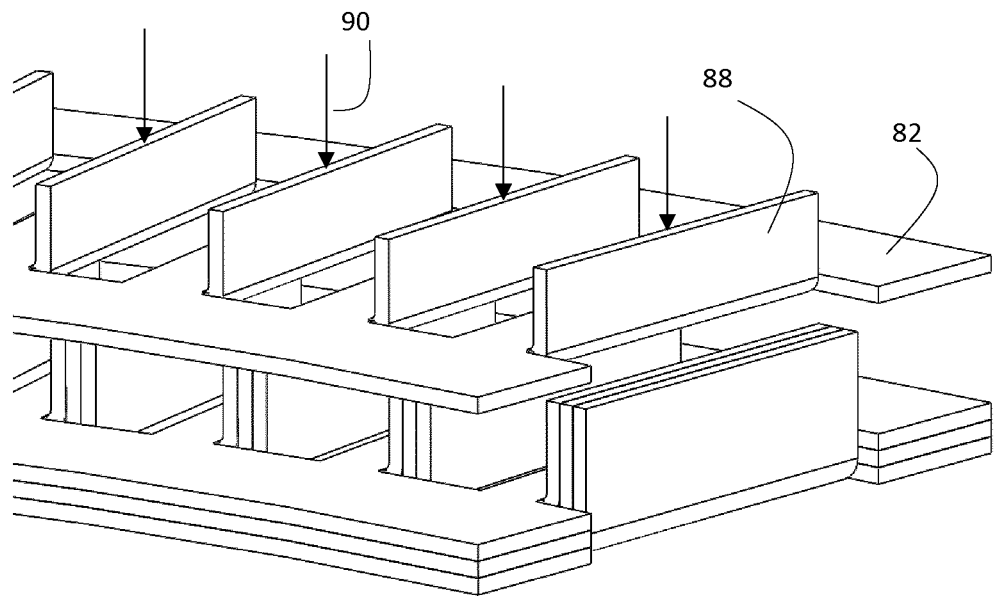
FIG. 18 is a partially collapsed exploded view of the stator of FIG. 15.

FIG. 18 shows the exemplary assembly of FIG. 17 with the bottom three of four layers 82 assembled, and the top layer moving to assembled position (motion shown by arrows 90).

Figure 19:
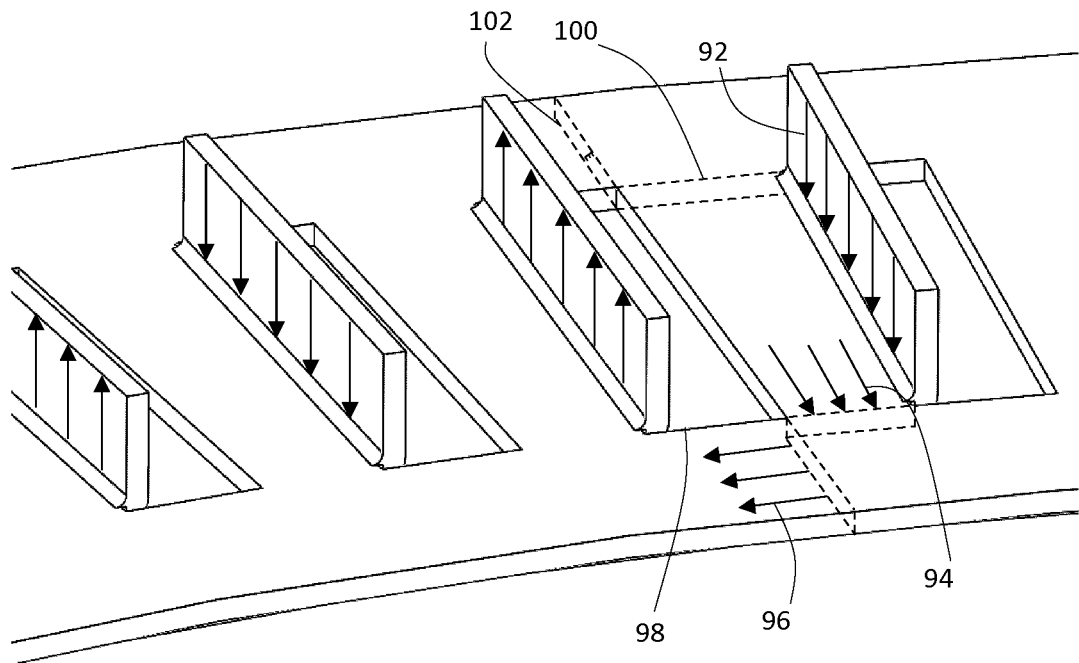
FIG. 19 is an isometric view of a layer of the stator of FIG. 15, showing flux paths.

FIG. 19 shows the flux path along each layer of a post and then toward the ID (in this exemplary embodiment). The flux path from post to post will include the uninterrupted path through the laminate material on the inner diameter (ID) of the posts (may also be on the outer diameter (OD) of the posts). Arrows 92 show flux within a post portion, arrows 94 showing flux heading to the ID of the stator insert, and arrows 96 showing flux heading from post to post radially inward from a gap 98. Flux could also pass to the outer diameter at 100 and pass from post to post radially outward from the gap 98 at outer end iron 102.

Figure 20:
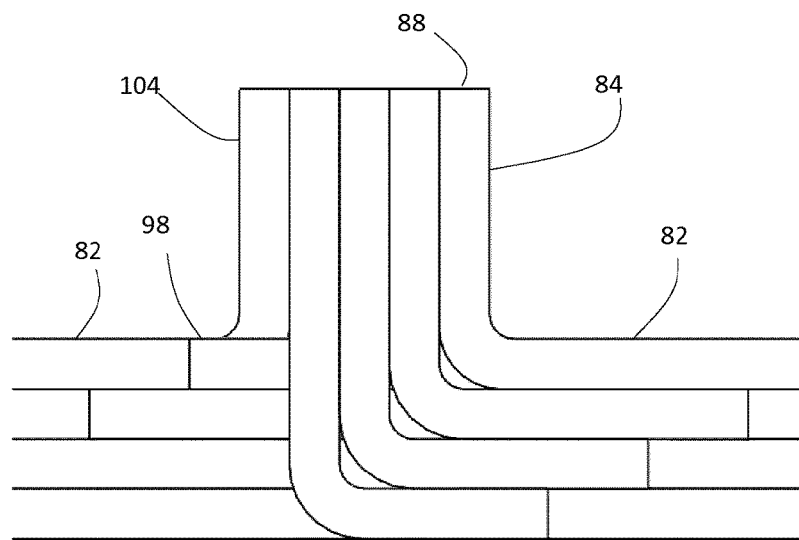
FIG. 20 is a cutaway view of a stator as in FIG. 15, but also having an additional post portion.

FIG. 20 shows a close-up view of a section through a post 84. Unbent portions of the layers 82, forming end iron portions, can be seen behind gaps 98. In this embodiment, there is an additional post portion 104 beyond the post portions 88 formed by bending flaps of the 4 main layers.

Figure 21:
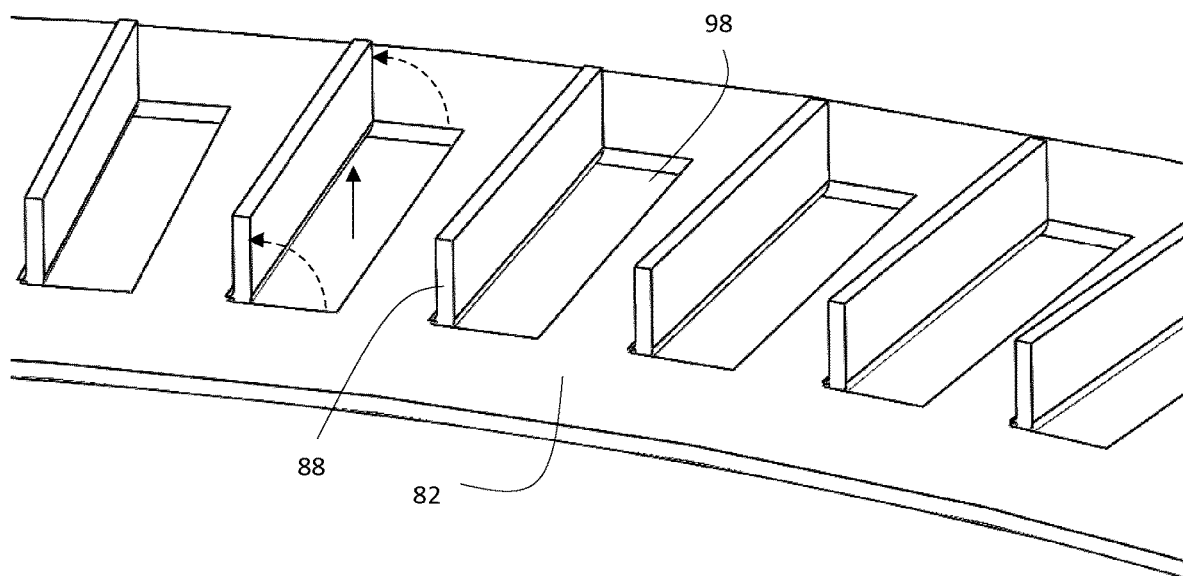
FIG. 21 is an isometric view of a layer of the stator of FIG. 15, showing a flap folding movement.

FIG. 21 shows a bending of flaps in the metal layers 82 to form post portions 88 and corresponding gaps 98.

Figure 22:
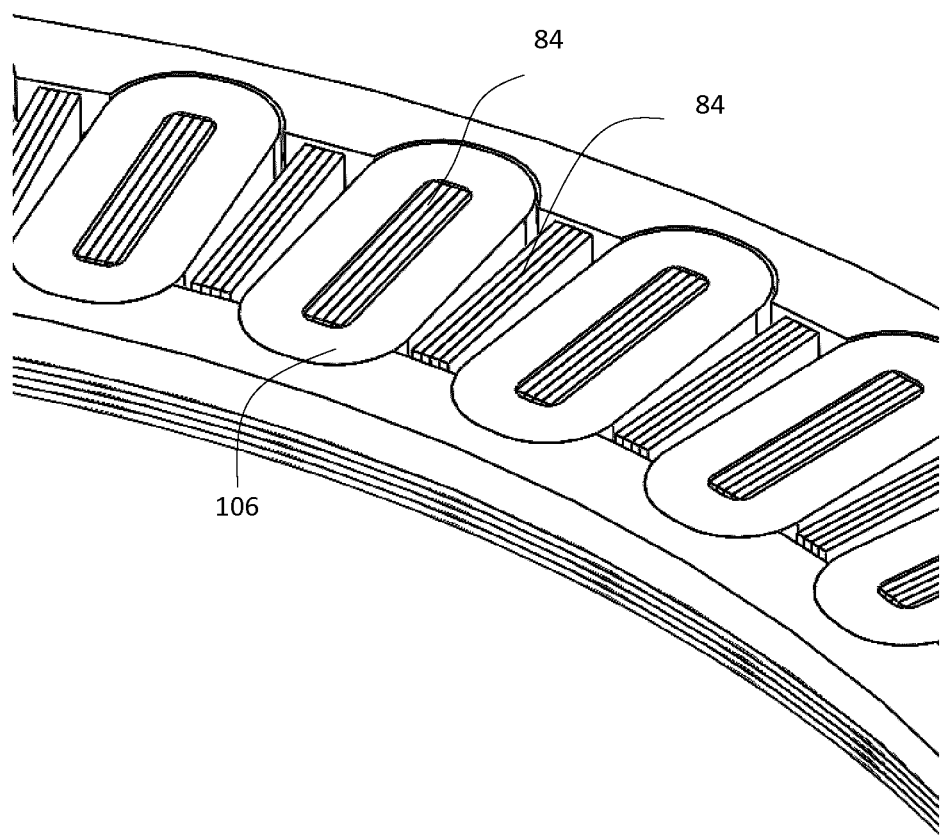
FIG. 22 is an isometric view of the stator of FIG. 15, also showing coils.

FIG. 22 shows part of a stator with posts 84 formed as shown in FIGS. 15-21, with a schematic drawing of coils 106 wound on the stator posts 84.

Progressively longer pockets of steel may be punched or cut to form the progressively longer posts toward the outer layers.

A process can be used to fabricate each post on each layer with a single or multiple punch and forming process where the outline of the post is punched (or laser cut etc) and then the posts are bent to 90 degrees) or other angles near 90 may work also).

Figure 52:
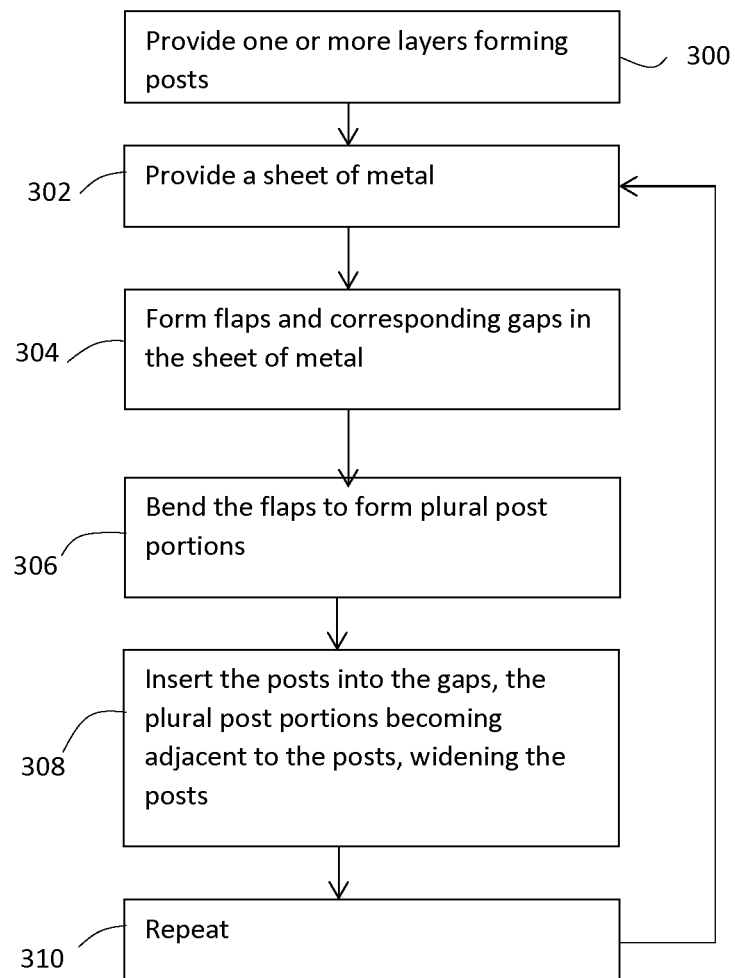
FIG. 52 is a flow diagram showing a method of forming a carrier using sheets of metal.

A method of forming a carrier is shown in FIG. 52. In step 300, one or more layers are provided collectively forming posts. In step 302, a sheet of metal is provided to form an additional single piece layer. In step 304, flaps and corresponding gaps are formed in the sheet of metal. In step 306, the flaps are bent to form plural post portions. In step 308, the posts of the base layer are inserted into the gaps, the plural post portions becoming adjacent to the posts, widening the posts. In step 310, optionally steps 302-310 are repeated using the combination of the one or more layers and sheet of metal formed by steps 300-308 as a new set of one or more layers collectively forming posts.

Figure 53:
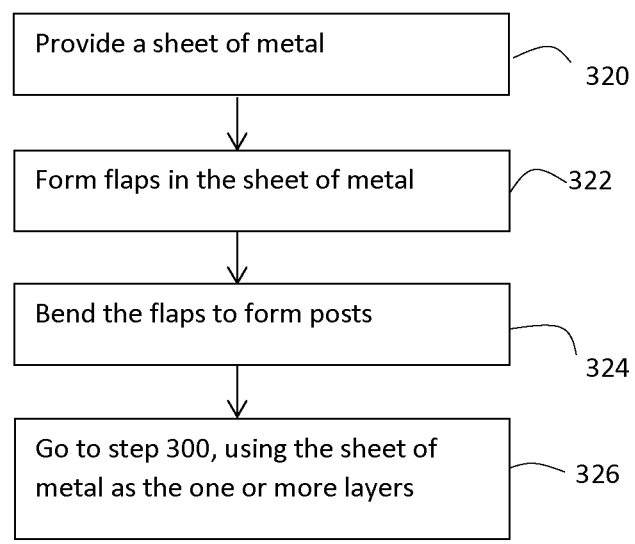
FIG. 53 is a flow diagram showing an enhancement to the method of FIG. 52.

An enhancement to the method of FIG. 52 is shown in FIG. 53. In FIG. 53, a base layer is formed by providing a sheet of metal in step 320, forming flaps in the sheet of metal in step 322, and bending the flaps to form posts in step 324. In step 326, the sheet of metal is a layer that is the one or more layers provided for step 300 of the method of FIG. 52.

Electric Machine with Solid Stator Comprising Inserts

Embodiments of the present device use one or more inserts, such as an insert ring, to reduce the maximum tangential thickness of the posts with minimal reduction of the magnetic flux path cross sectional area. The result is a stator of simple construction from a solid material such as steel or iron that provides the strength and high precision, but with a reduced maximum tangential thickness flux path in any one solid piece for reduced eddy currents.

Figure 23:
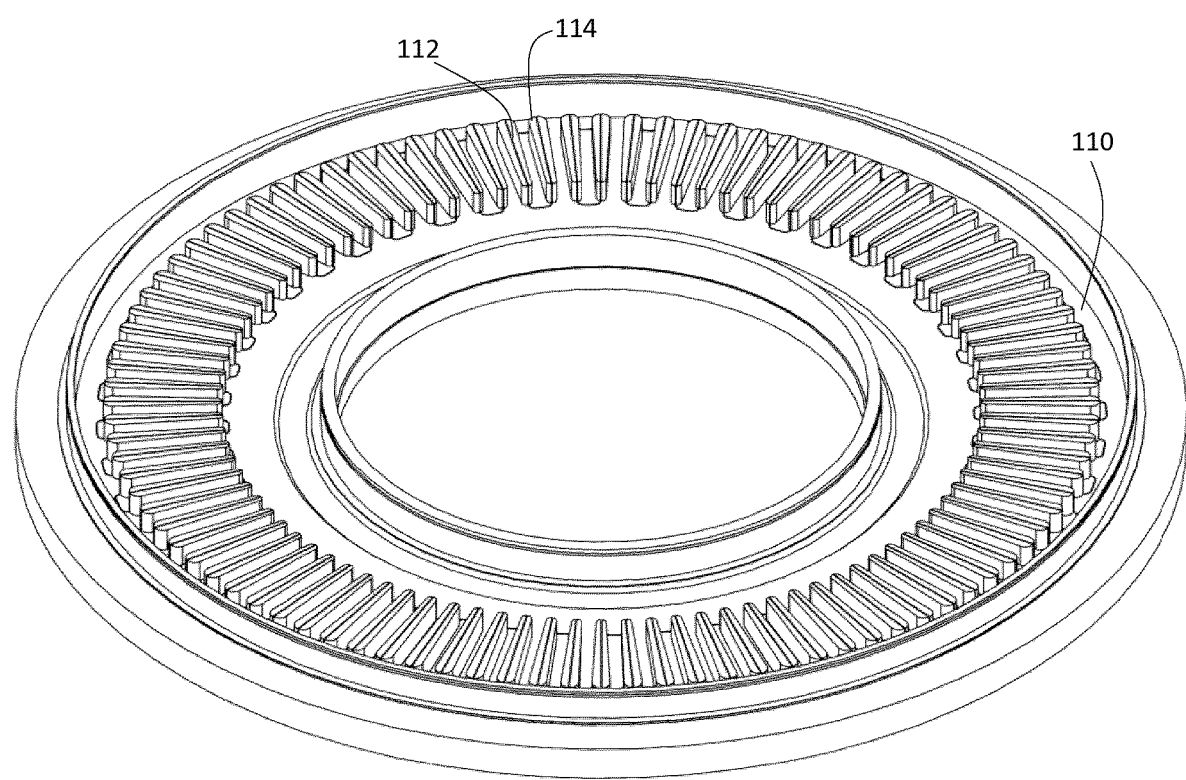
FIG. 23 is an isometric view of a stator having an insert with portions connecting every second post.
Figure 26:
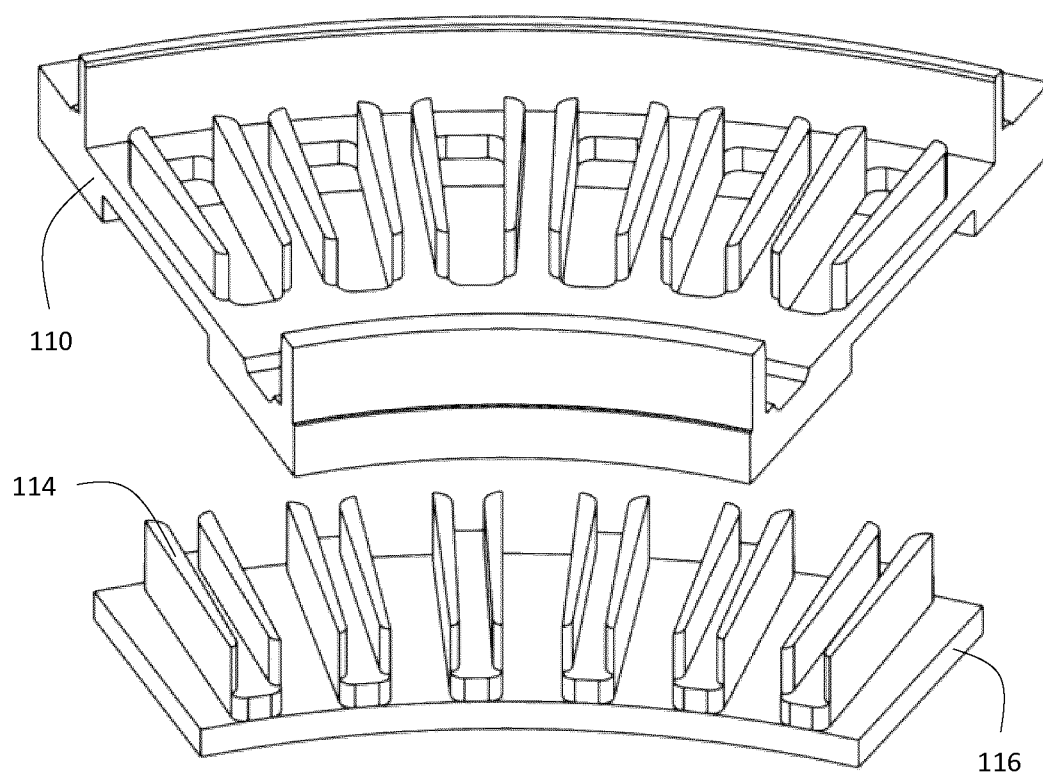
FIG. 26 is an exploded view of the stator of FIG. 23.

In an embodiment, shown here by way of non-limiting example in an axial flux configuration, every post on the stator disk is split into two sections. In this exemplary embodiment along a radial line such that the flux path between two posts is made up of more than one component and in such a way that the cross section of the flux path is reduced and especially that the maximum tangential thickness of the flux path in a post is reduced. FIG. 23 shows an example stator with an insert ring installed. Each of the posts 112 has a portion of the post (in this example, half of the post, but posts may be split in to more than two sections) that is a solid monolithic part of the main stator disk 110. Each post 112 has a section 114 removed which includes approximately half of the post and the back iron axially outward from the post. In this non-limiting exemplary embodiment, two directly adjacent posts have material removed from portions of the two posts that face each other. Although the device will be functional with the same tangential side of every post removed, removing pairs of inward facing halves of pairs of posts as shown here has the advantage of providing an uninterrupted flux path from one half of a post to half of an adjacent post. This allows for the electrical insulation of the main stator and/or the insert/s to prevent eddy currents from crossing between these components, without also affecting the flux path. If the same tangentially facing section of each post is removed, the flux will have to jump the airgap between the components to connect between inward facing sections of adjacent posts. This reduces power and efficiency. As shown in FIG. 26, the inward facing sections of adjacent post pairs are removed from the main stator component 110 and a monolithic insert ring 116 with the missing post halves is used to replace the missing sections.

Figure 24:
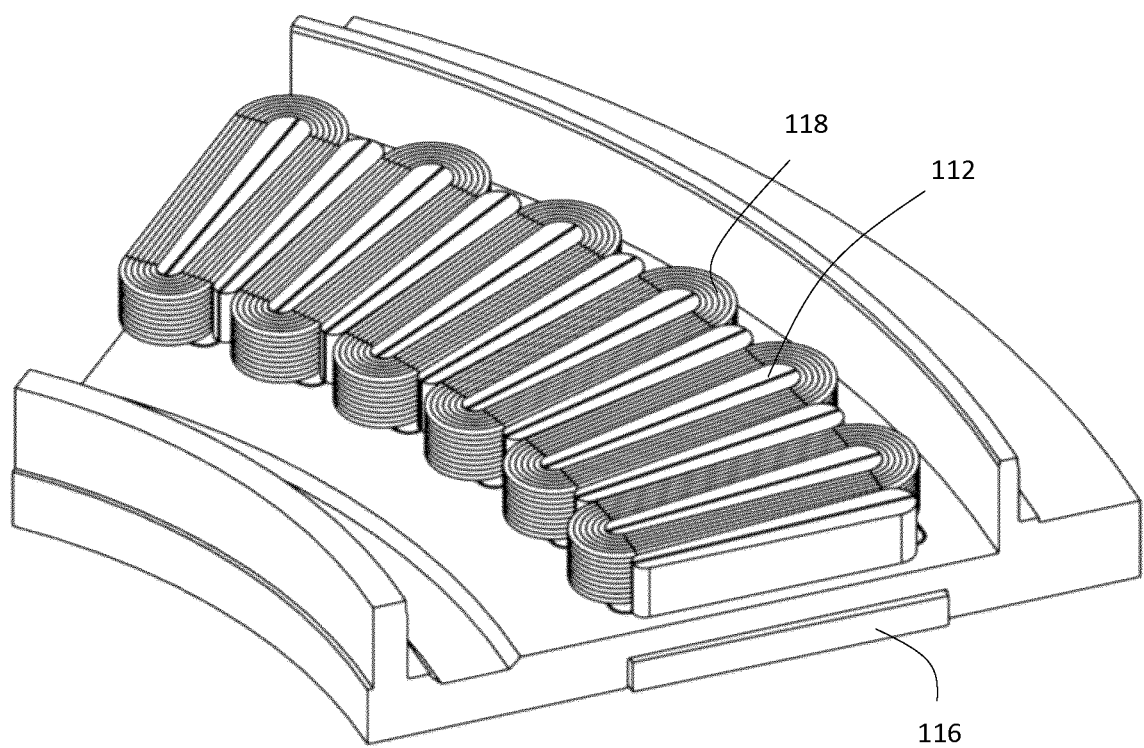
FIG. 24 is an isometric view of a sector of the stator of FIG. 23, showing coils.
Figure 25:
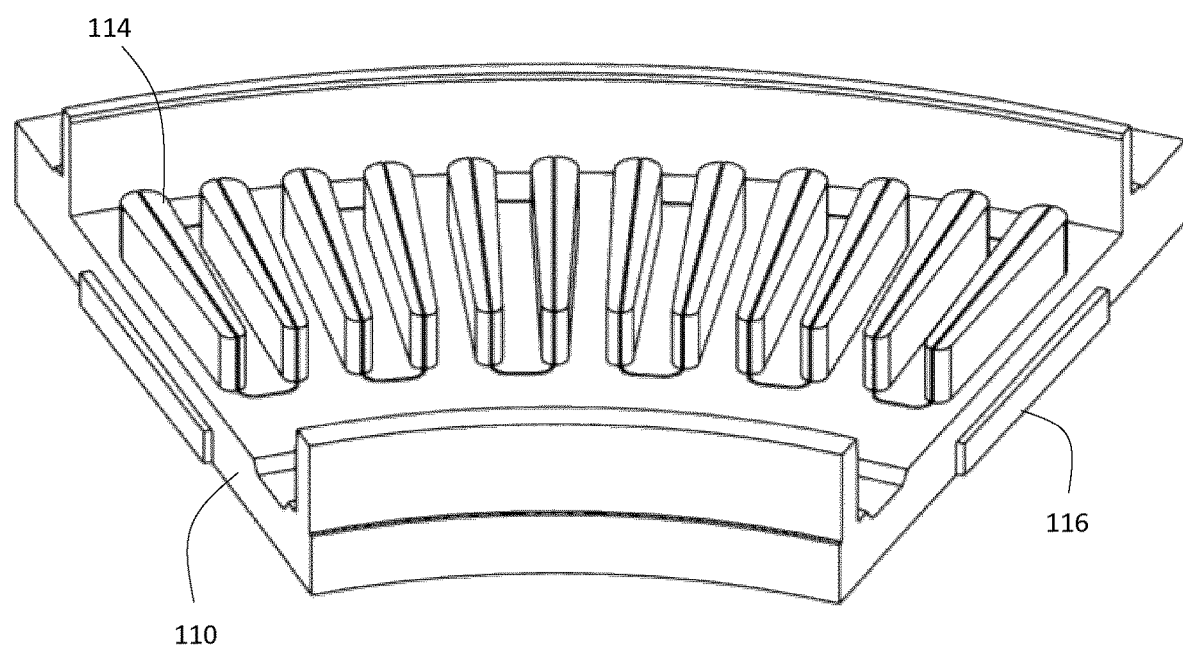
FIG. 25 is an isometric view of the stator of FIG. 23.

Many types of winding configurations may be used. If a distributed winding configuration is used, a one-piece insert ring is preferred. If a concentrated winding is used, individual inserts may be used. FIG. 24 shows an exemplary stator section with insert ring 116 and simplified coils 118 installed on every second post in an exemplary concentrated winding configuration. FIG. 25 shows the embodiment of FIG. 24 without the coils 118. FIG. 26 shows an exploded view of the same embodiment, showing the main stator disk 110 and insert ring 116.

Flux in an electric machine stator using a concentrated winding such as in this example, can be designed to connect from post to adjacent post along the shortest flux path. If the facing surfaces of two adjacent posts are made of the same monolithic material as shown here (through the main stator on one side of a post to the inward facing surface of the adjacent post in one direction, and through the insert on the other side of a post to the inward facing surface of the adjacent post in the other tangential direction) then there is no airgap created in the flux path between posts and there is no significant power loss as a result of reducing the flux path maximum thickness.

Figure 27:
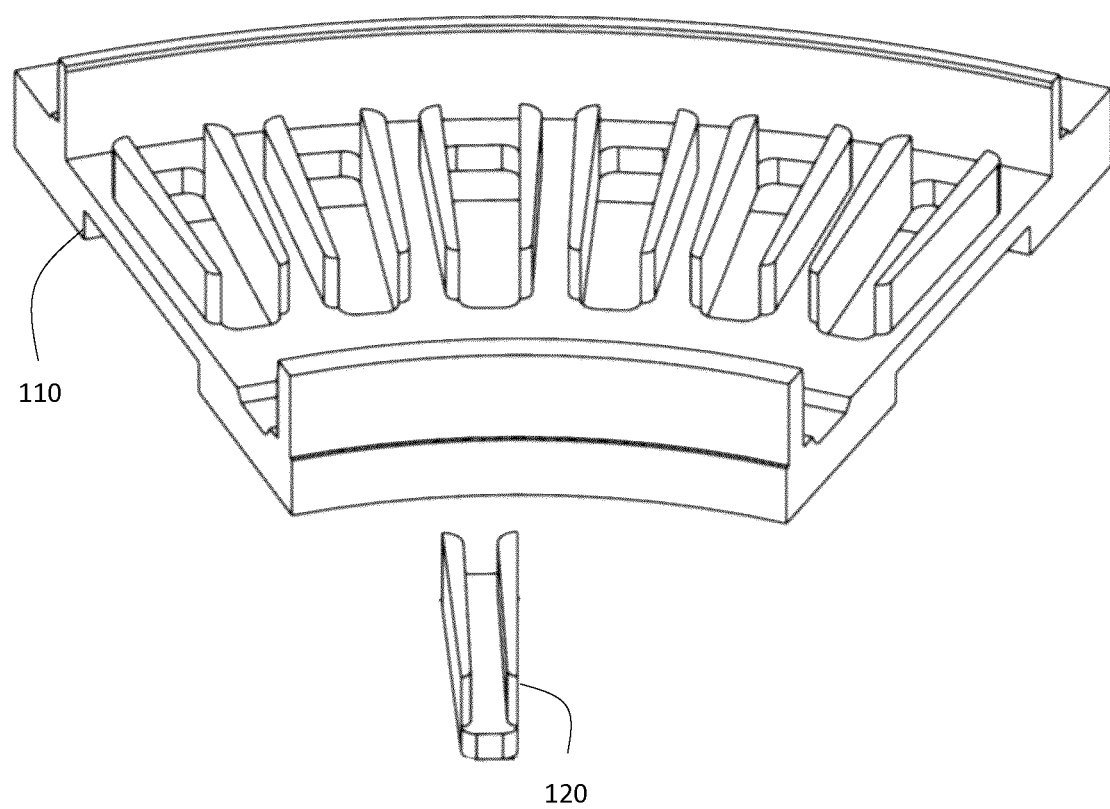
FIG. 27 is an exploded view of a stator as in FIG. 23 but using smaller inserts instead of one large insert.

FIG. 27 shows an embodiment with individual inserts 120 instead of an insert ring. This configuration, shown for an axial flux stator, is especially useful for radial flux stators.

Figure 28:
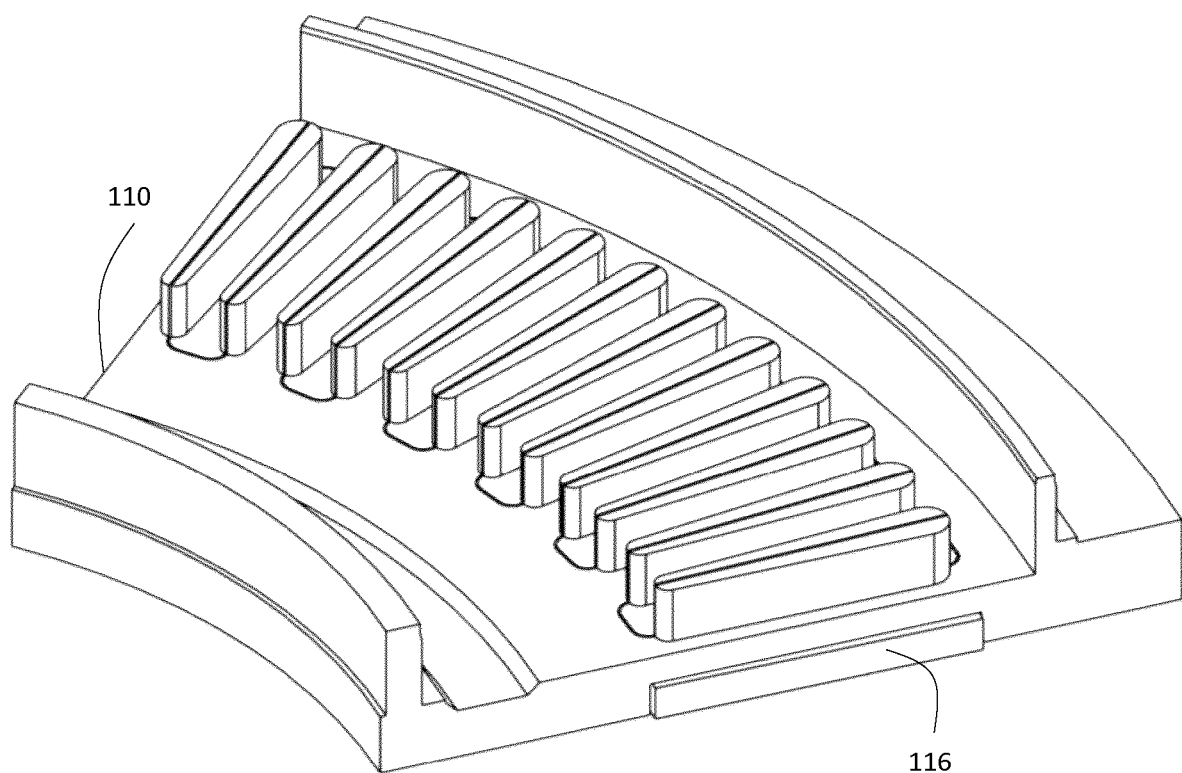
FIG. 28 is an isometric view of a sector of the stator of FIG. 23.
Figure 29:
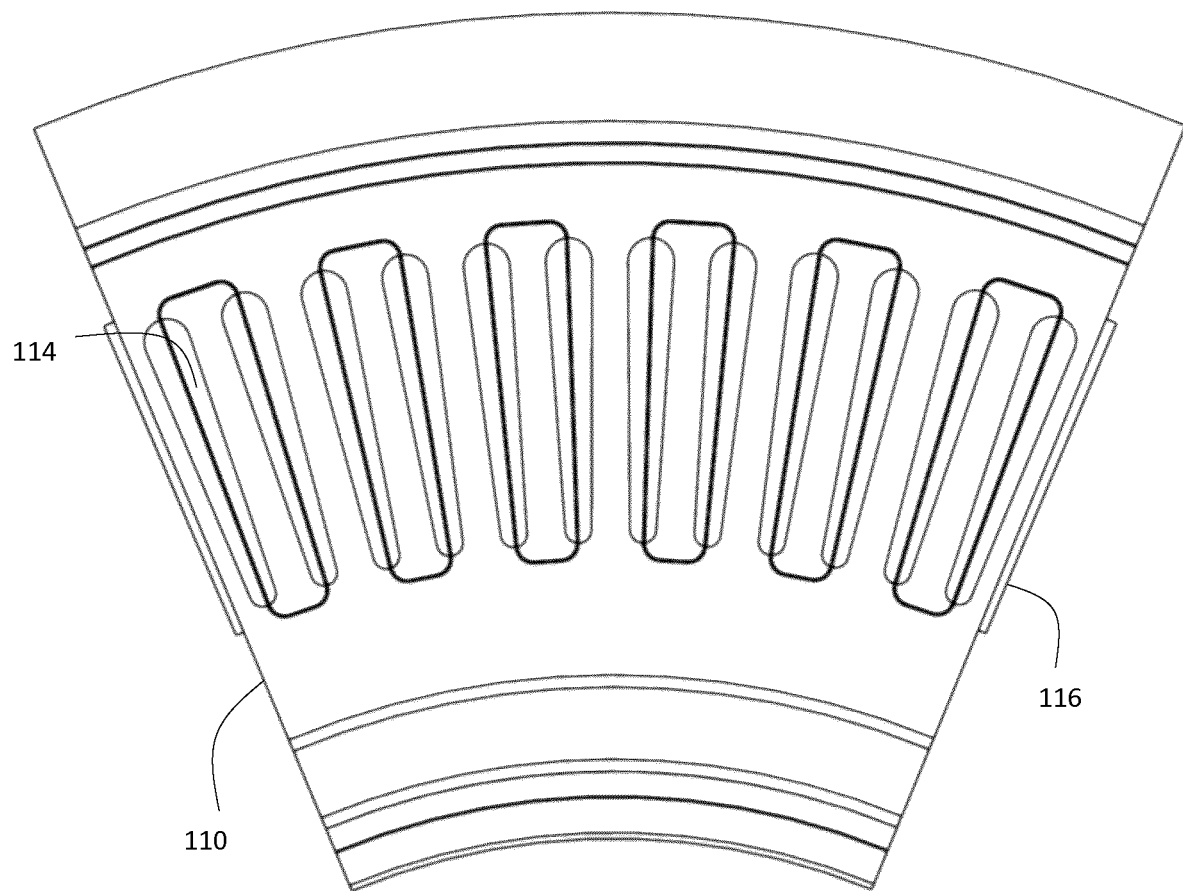
FIG. 29 is a top view of a sector of the stator of FIG. 23.

FIG. 28 shows an additional isometric view of the embodiment of FIGS. 23-26 FIG. 29 shows a top view of the same embodiment.

Stator for Electric Machine

That Allows High Fill Factor for Windings

Needle winding a stator of an electric machine is desirable to decrease production time and cost through automation. Needle winding typically has the drawback of reduced fill factor of conductor coils in a slot because the needle takes up room in the slot. This is especially true in a high pole count motor where the needle can take up a high percentage of the slot width.

Embodiments of the device allow a high fill factor by removing every second post from the stator during the winding process, and inserting a ring with every second post after the winding is completed.

This method could also be used with other coil creating or inserting or application methods.

Figure 30:
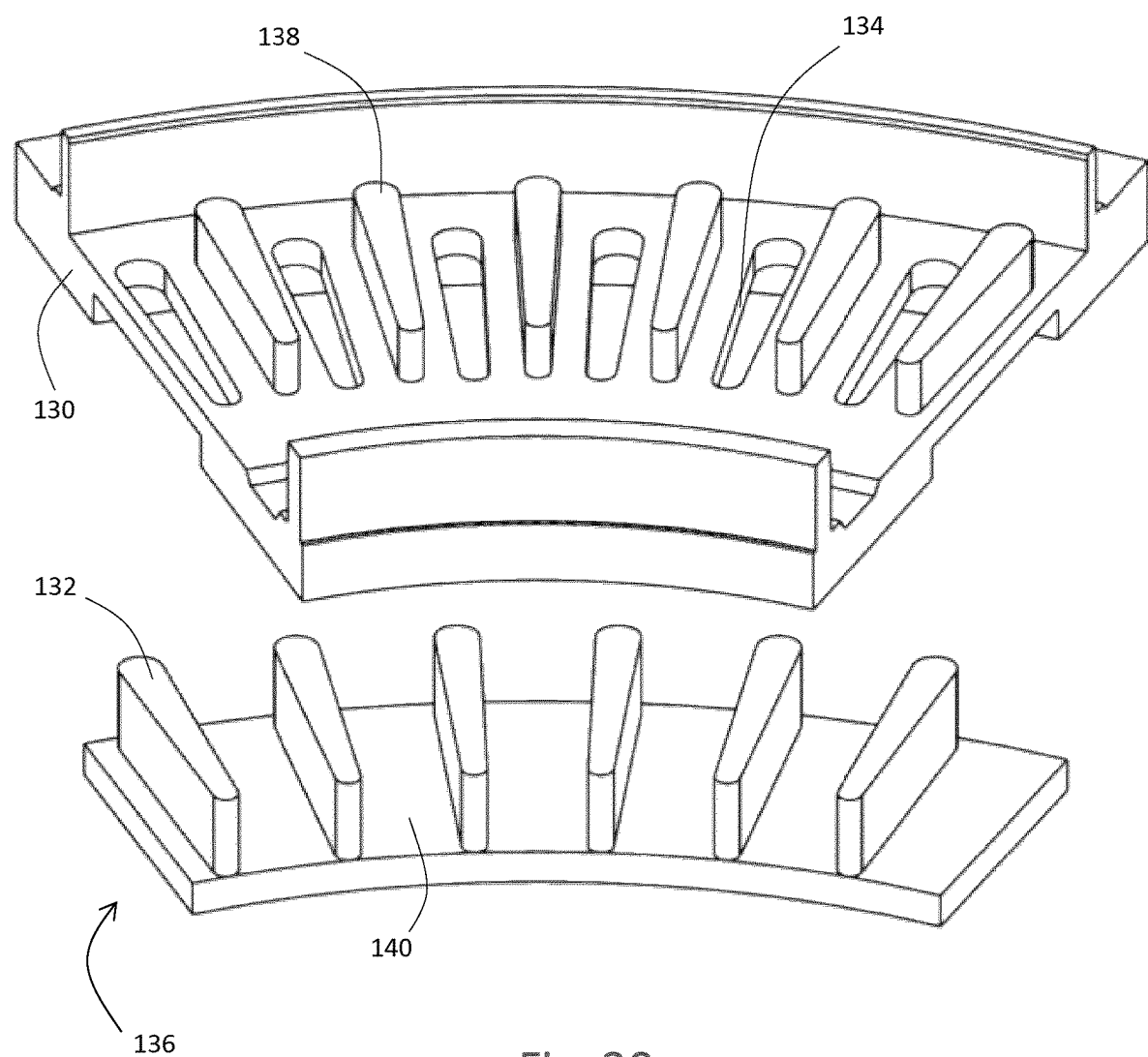
FIG. 30 is an exploded view of a stator and insert where every second post is part of the insert.

FIG. 30 is an exploded view showing a main stator body 130 and an insert 136 for inserting into the main stator body. Insert 136 comprises every second post 132 and an associated backiron 140. The posts 138 that are not part of the insert are in this embodiment part of the top portion 130 which in this embodiment is the main stator body. Between these posts are slots 134 to accommodate the posts on the insert. Many different materials may be used such as but not limited to steel or iron or a powdered soft magnetic material.

Figure 31:
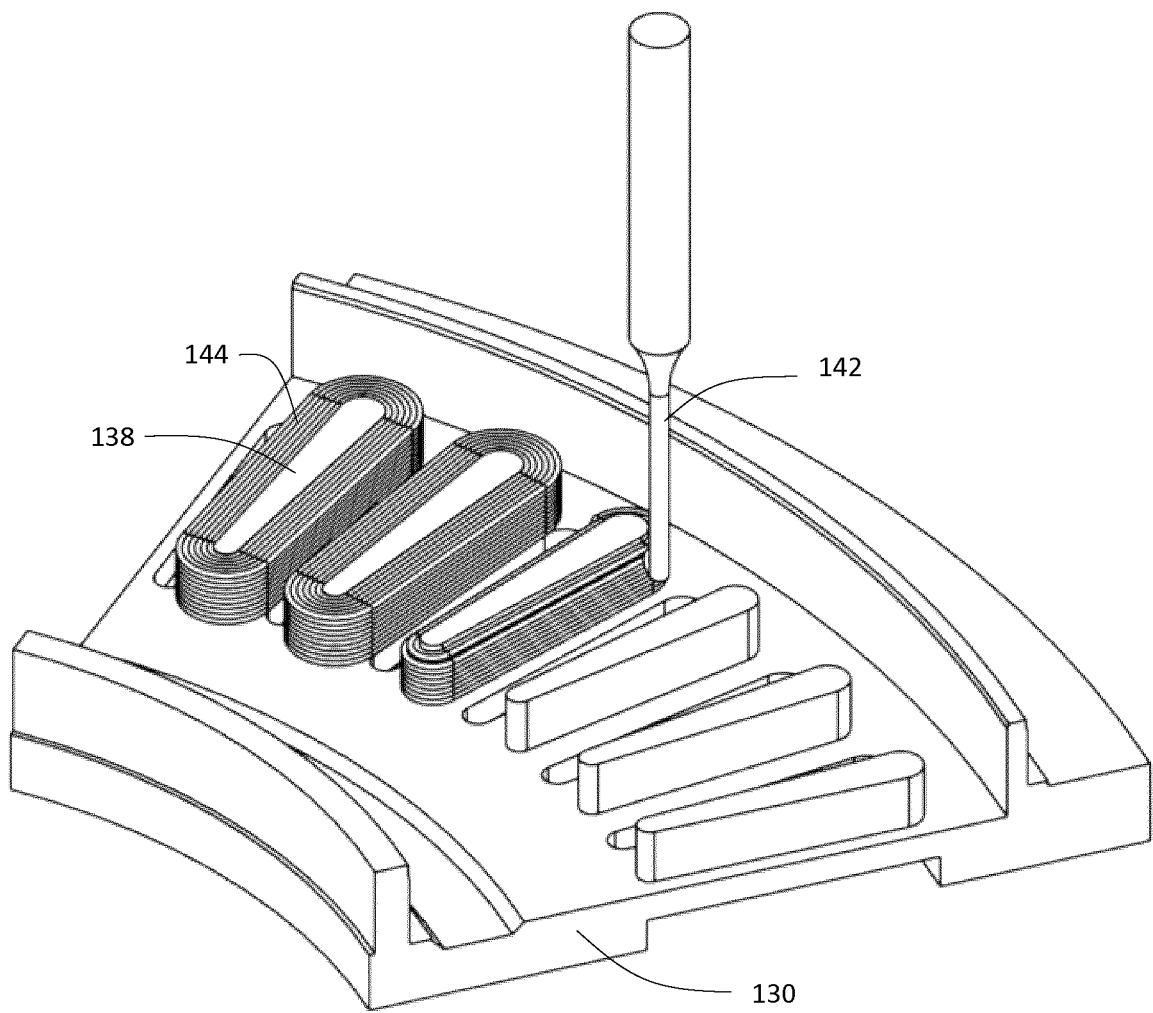
FIG. 31 is an isometric view of a sector of the stator of FIG. 30 where a winding machine has partially wound the posts of the stator that are not part of the insert.

FIG. 31 is a simplified view of the main stator body of FIG. 31 with a needle winding machine 142 applying coils 144 around the posts 138 of the main stator body.

Figure 32:
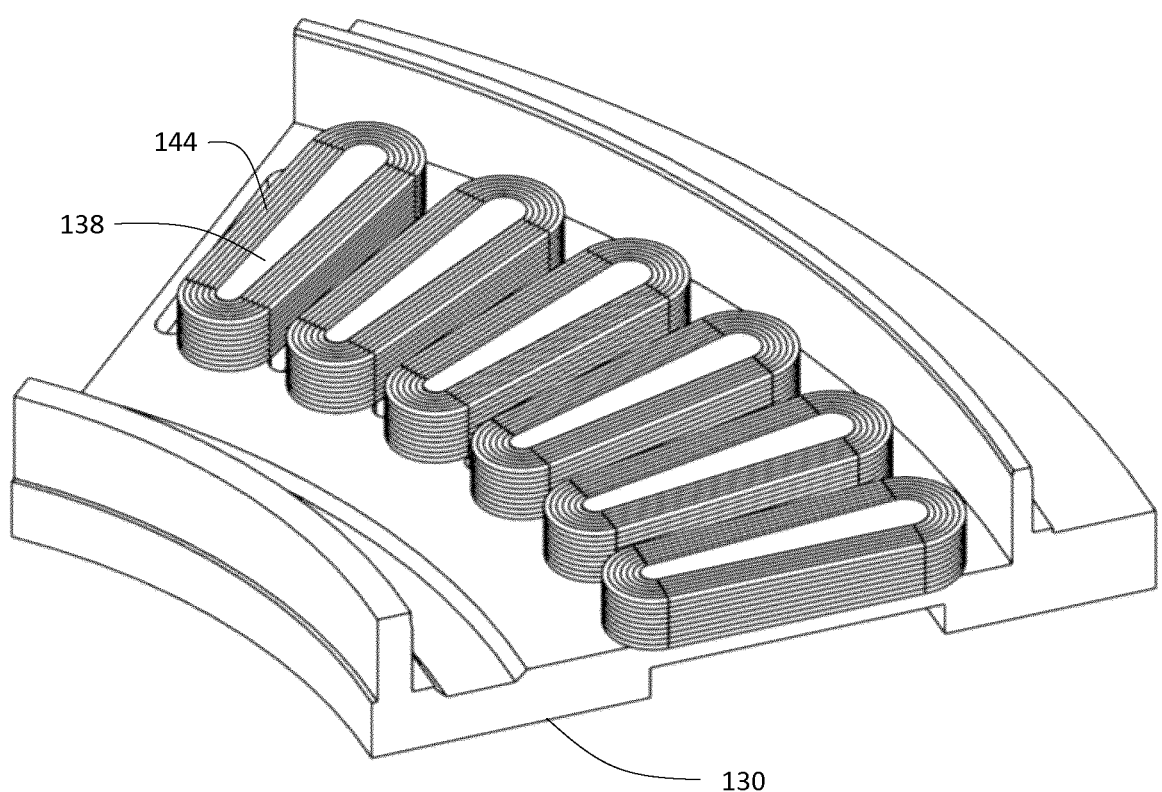
FIG. 32 is an isometric view of the sector of the stator of FIG. 30, where the posts of the stator that are not part of the insert have been wound.

FIG. 32 is a view of the main stator body of FIG. 31 with the winding process of FIG. 31 fully applied, but before the insert with the other posts is inserted.

Figure 33:
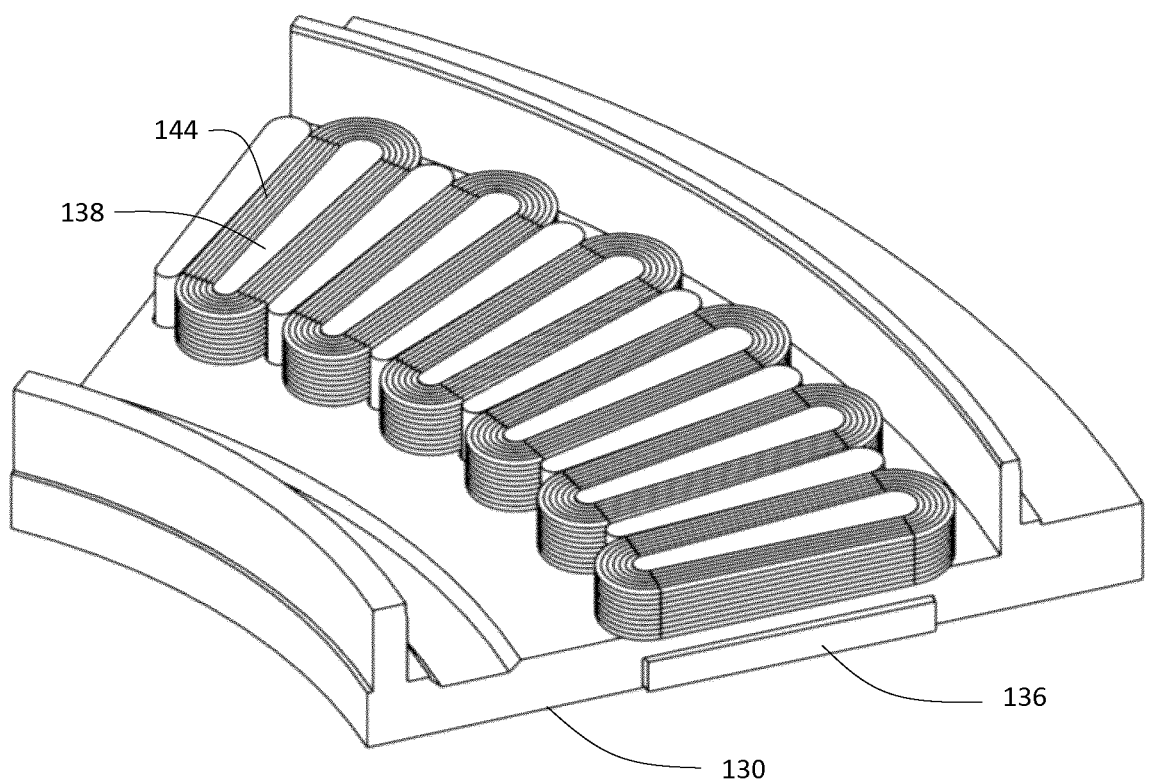
FIG. 33 is an isometric view of the sector shown in FIG. 32, with the insert inserted.

FIG. 33 is a view of the main stator body of FIGS. 30-33 with the insert ring 136 inserted. Note that high fill factor is achieved.

Figure 34:
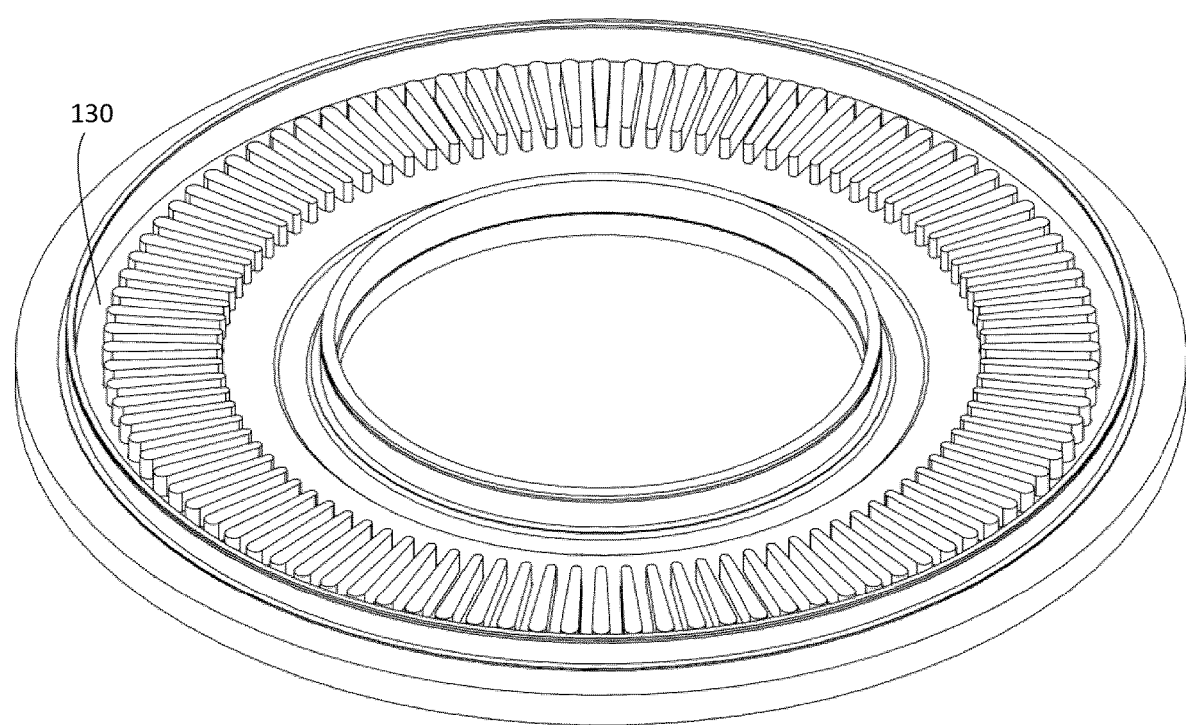
FIG. 34 is an isometric view of the stator of FIG. 30 with the insert inserted.

FIG. 34 shows a stator including a main stator body plus an insert with the insert inserted into the main stator body so all posts are present. No coils are shown.

Figure 35:
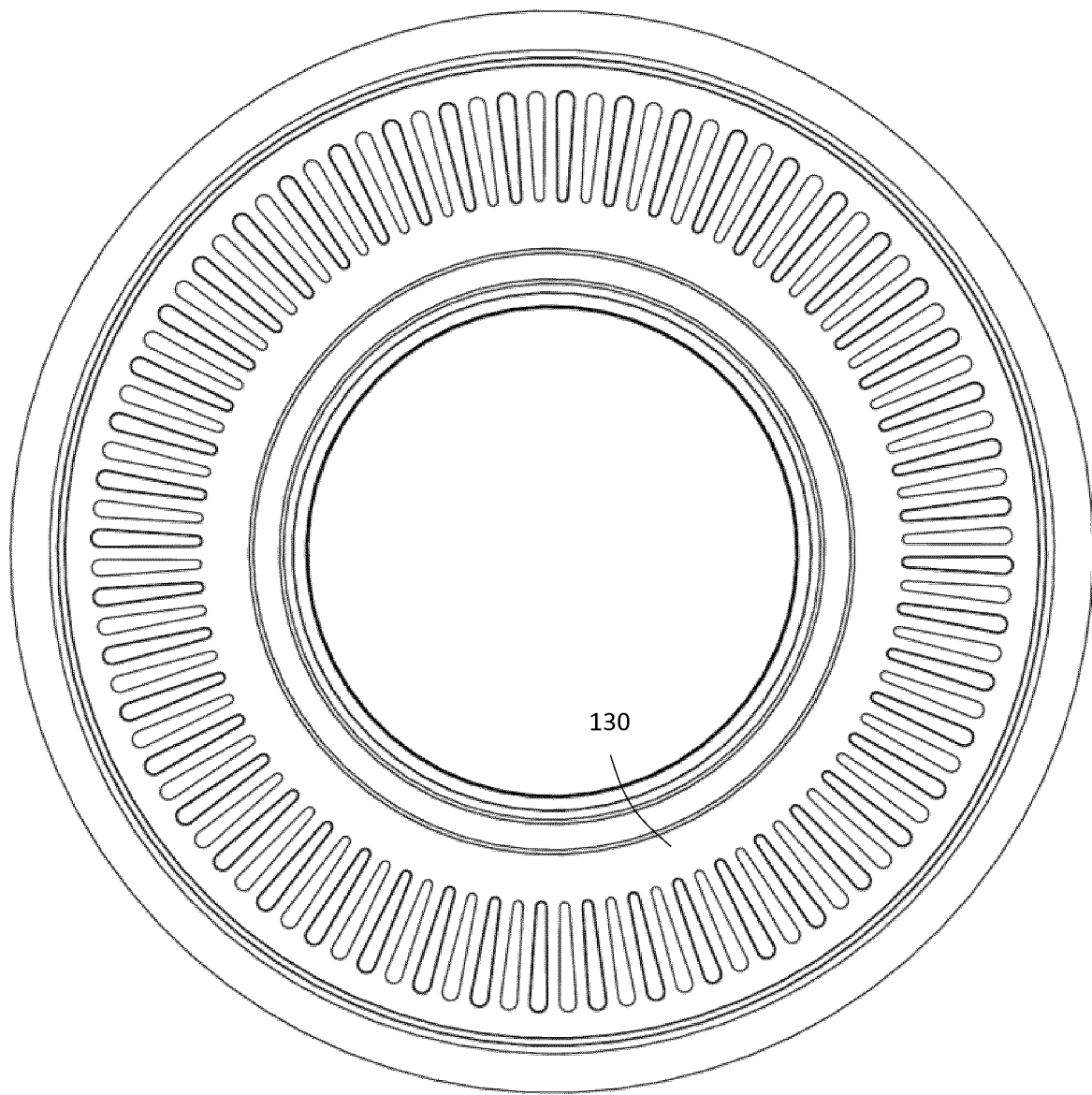
FIG. 35 is a top view of the stator of FIG. 34.

FIG. 35 shows a top view of the main stator body.

Figure 36:
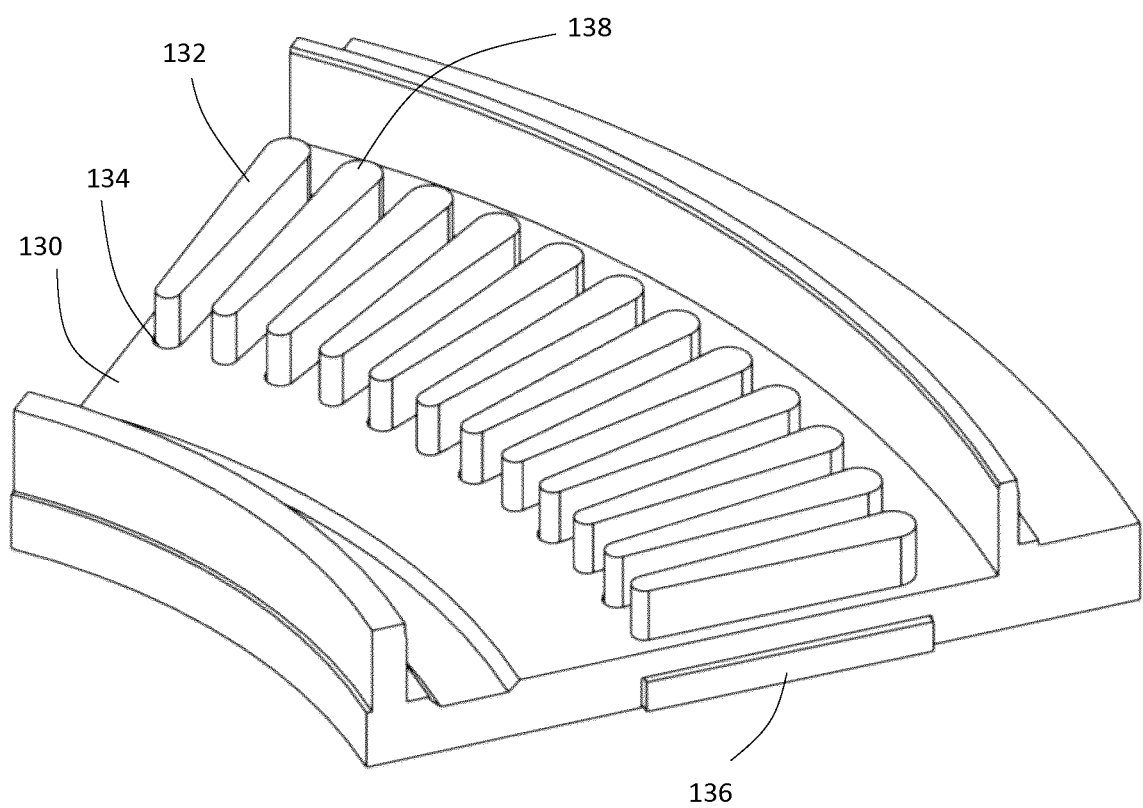
FIG. 36 and FIG. 37 are additional isometric views of sectors of the stator of FIG. 30.
Figure 37:
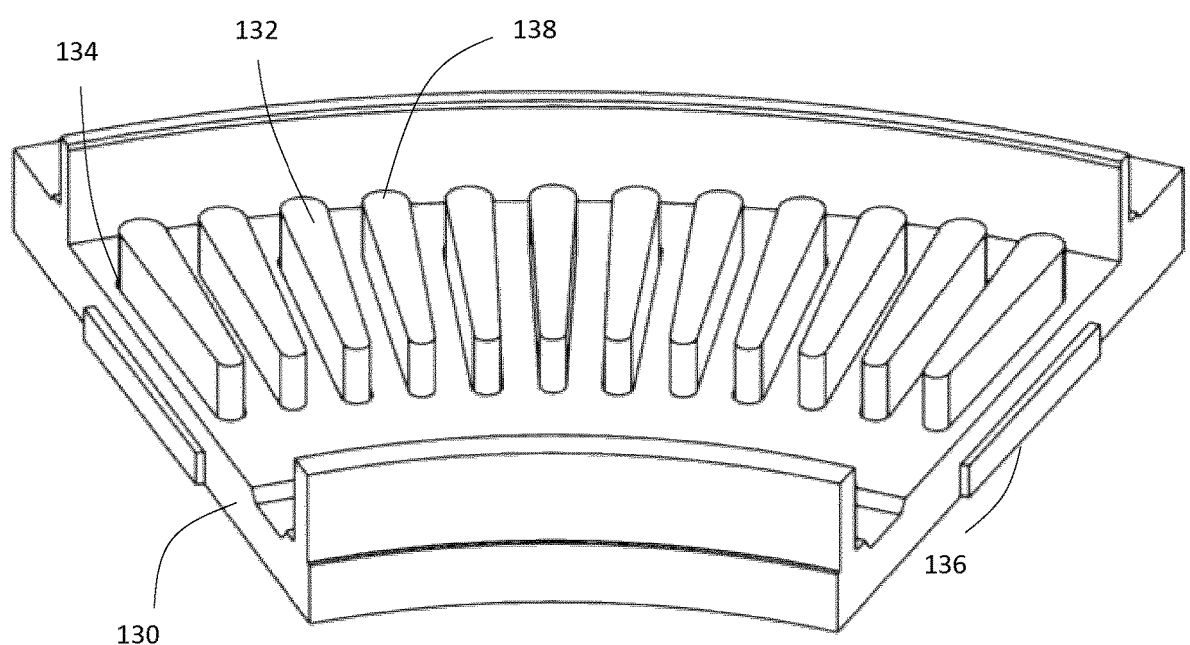
Figure 38:
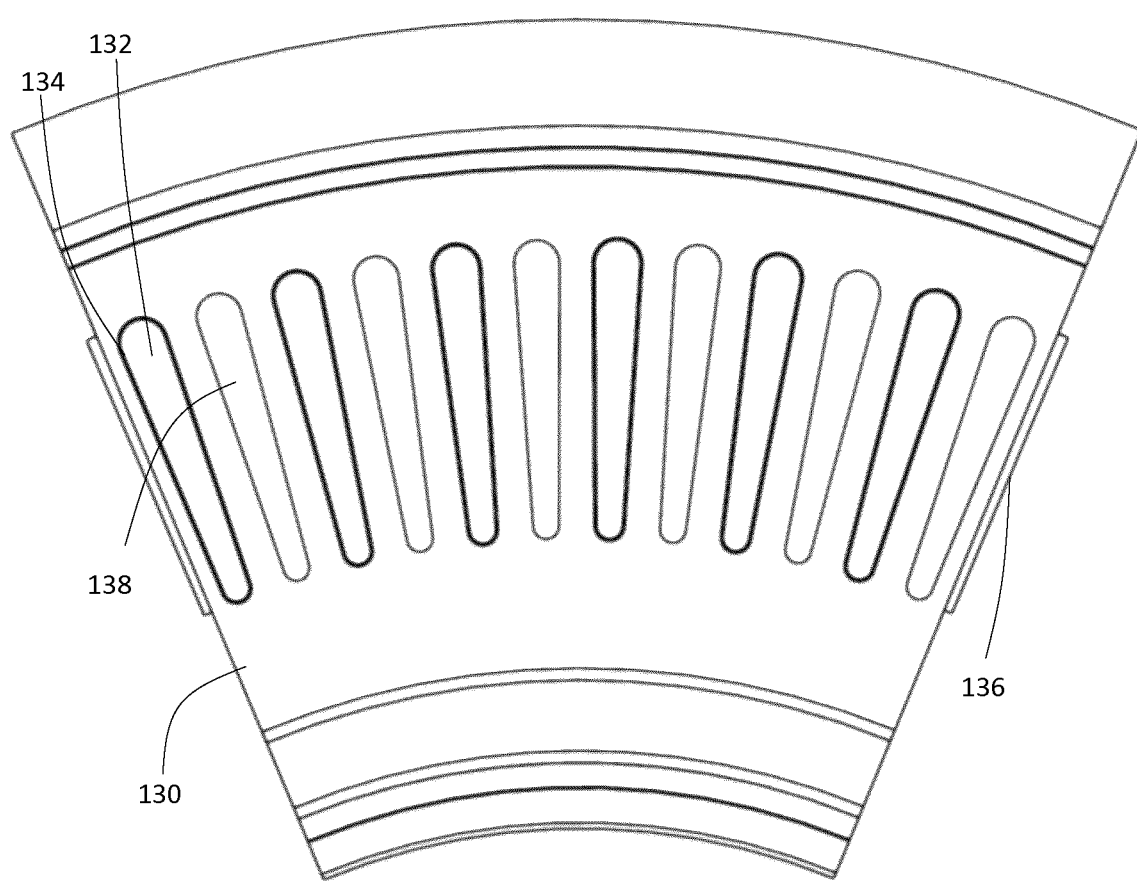
FIG. 38 is a top view of a sector of the stator of FIG. 30.

FIG. 36 and FIG. 37 show isometric views, and FIG. 38 shows a top view, of a section of the stator of FIG. 34.

Figure 54:
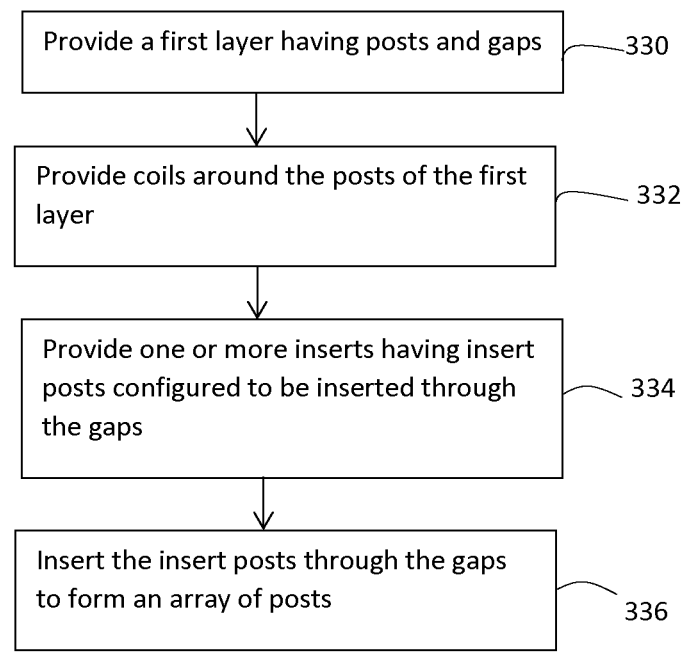
FIG. 54 is a flow diagram showing a method to allow greater space efficiency using inserts.

FIG. 54 shows a method of assembling a carrier for an electric machine. In step 330, a first layer is provided, with plural posts extending from the first layer, the first layer defining gaps through the first layer intermediate between successive posts of the plural posts. In step 332, a respective conductor coil is provided around each of the plural first posts. This may be by, for example, winding with a needle, but could also be by any other method of applying a coil. In step 334, one or more inserts are provided having insert posts configured to be inserted through the gaps. In step 336, the insert posts are inserted through the gaps to form an array of posts.

Multi-Insert Embodiment

FIGS. 39-51 show an example insert arrangement to combine the features disclosed above of eddy current reduction and providing space for needle winding.

A stator is made up of a main stator body 200 having an alternating tooth geometry that includes empty cavities in place of every second tooth, where each tooth on the main stator body is split in half with the remaining half being a partial cavity. A second component 202 with similar tooth geometry of alternating cavities and partial teeth is inserted to the main stator body to fill the partial cavities left in the main stator body leaving only alternating cavities remaining, giving space for a stator needle to fit between posts for needle winding. The partial teeth of both components have rounded cut geometries for easier machining. After the first component is inserted, the remaining cavities are filled with multiple separate inserts 204 after needle winding is completed around the alternating stator teeth. The inserts 204 are made up of split halves of stator teeth that are connected by a common back iron piece. Separate split up stator teeth allow for thin flux paths through the stator sections.

Figure 39:
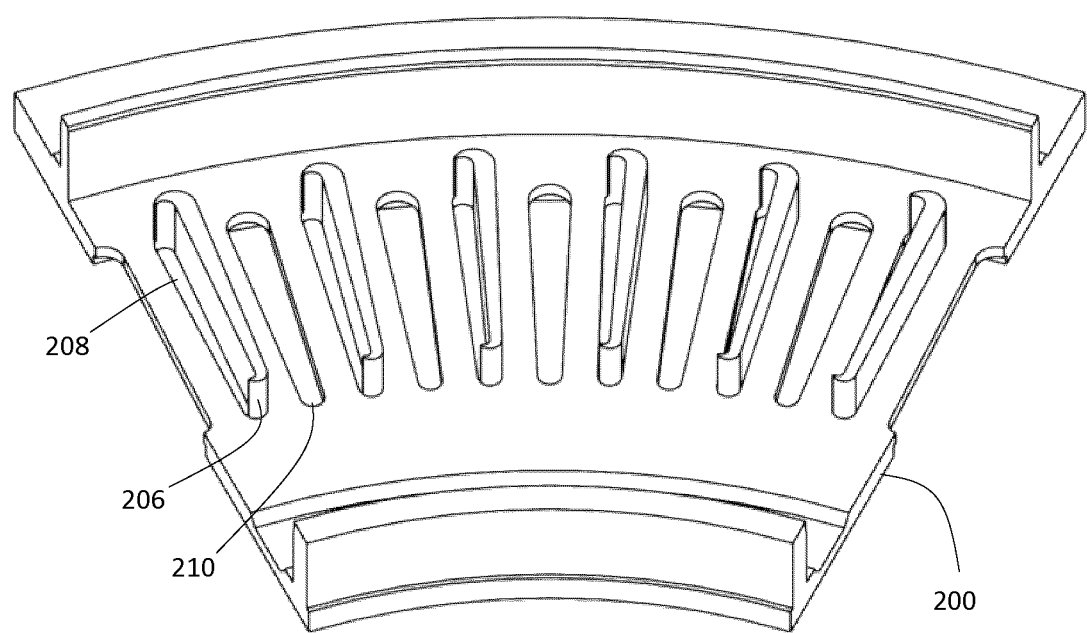
FIG. 39 is an isometric view of a top element for a multi-insert system.
Figure 40:
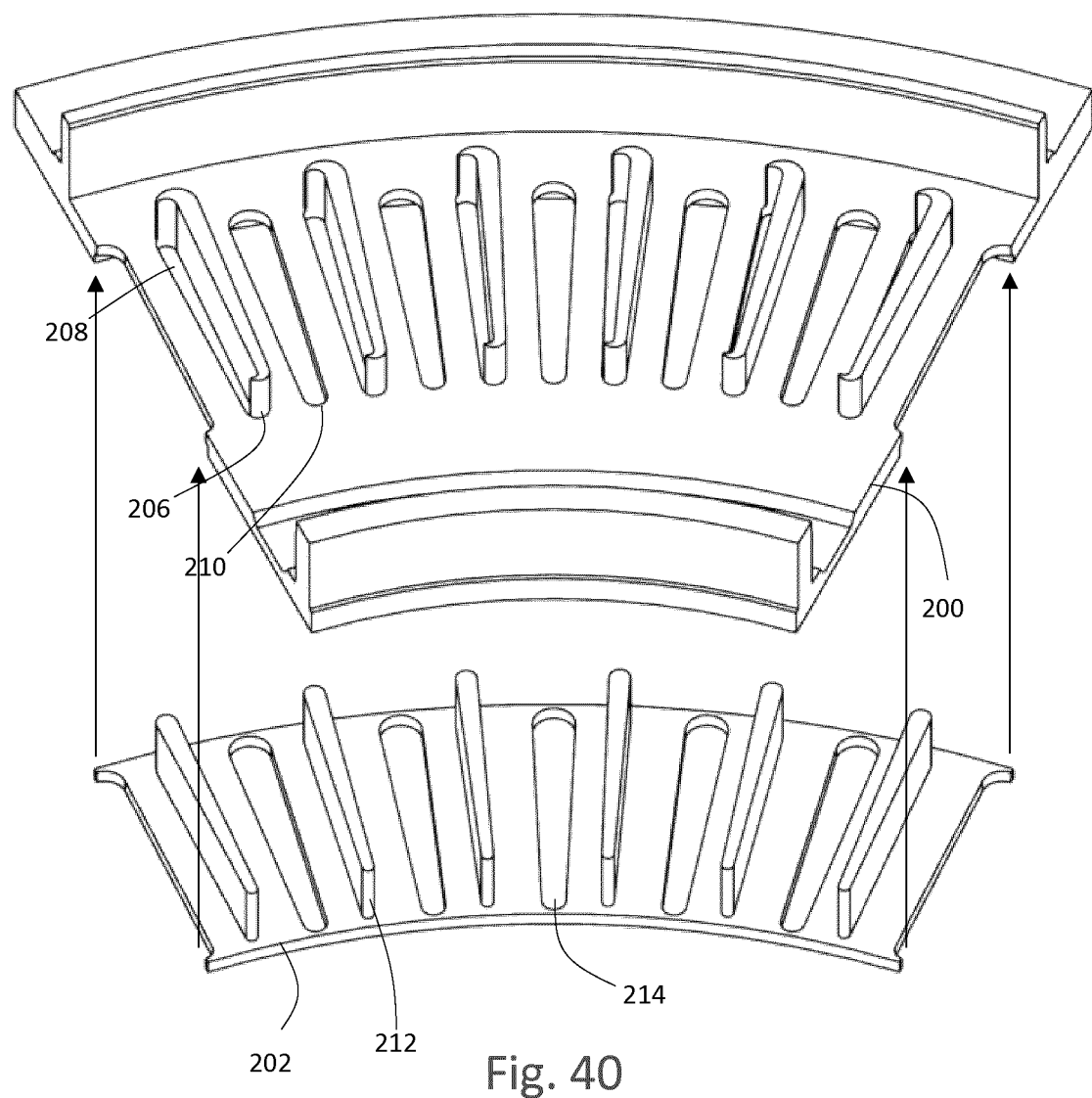
FIG. 40 is an exploded view of the top element of FIG. 39 and a first insert.

FIG. 39 shows a sector of the main stator body 200. The main stator body has partial posts 206 and gaps 208 adjacent the partial posts and other gaps 210 between the partial posts. FIG. 40 shows an exploded view of the sector of the main stator body 200 with a corresponding sector of the insert 202. The insert 202 has partial posts 212 corresponding to the gaps 208 adjacent the partial posts of the main stator body 200, and gaps 214 corresponding to the gaps 210 between the partial posts 206 of the main stator body 200.

Figure 41:
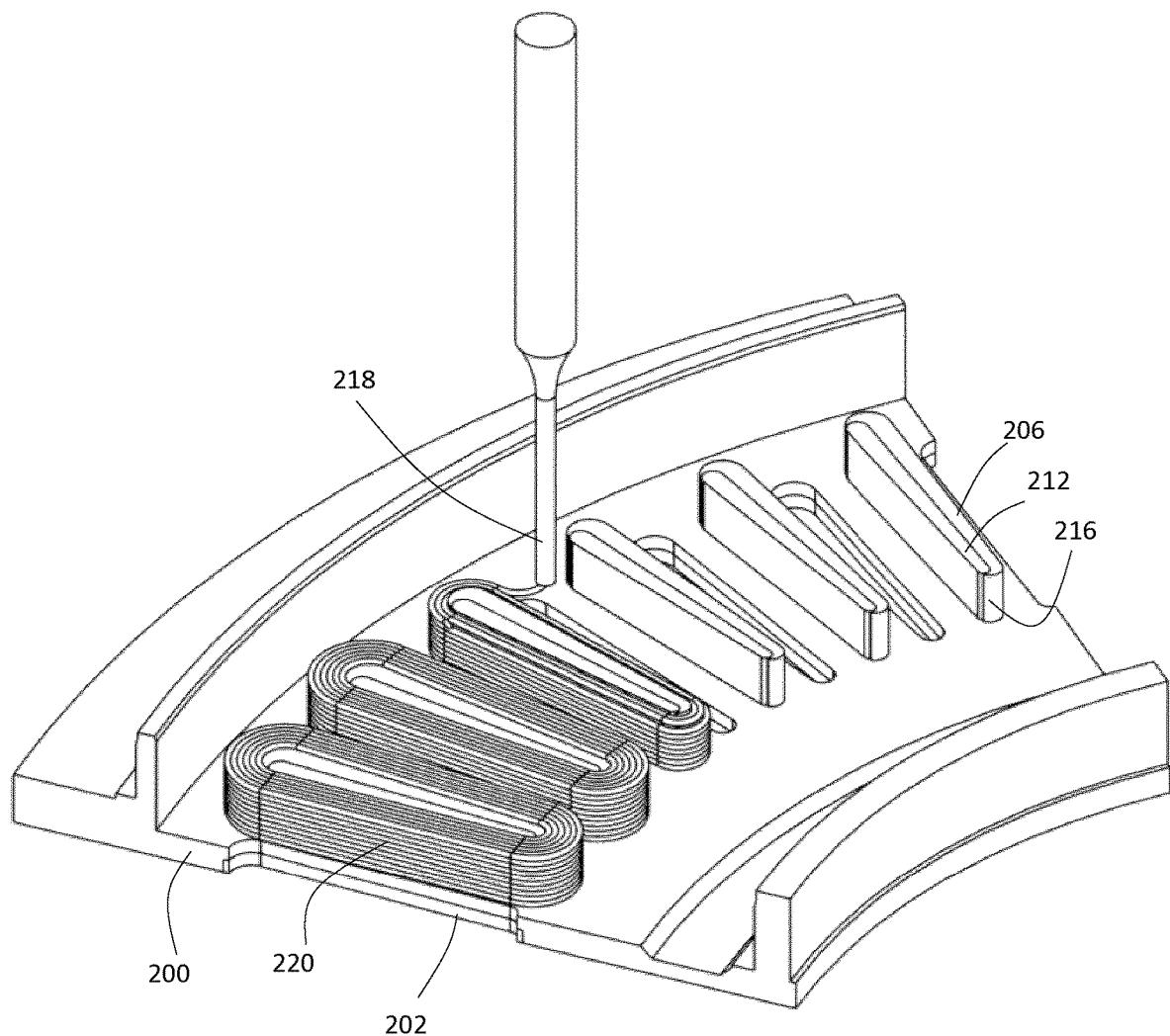
FIG. 41 is an isometric view of a needle winding process being applied to the collapsed top element and first insert of FIG. 40.
Figure 42:
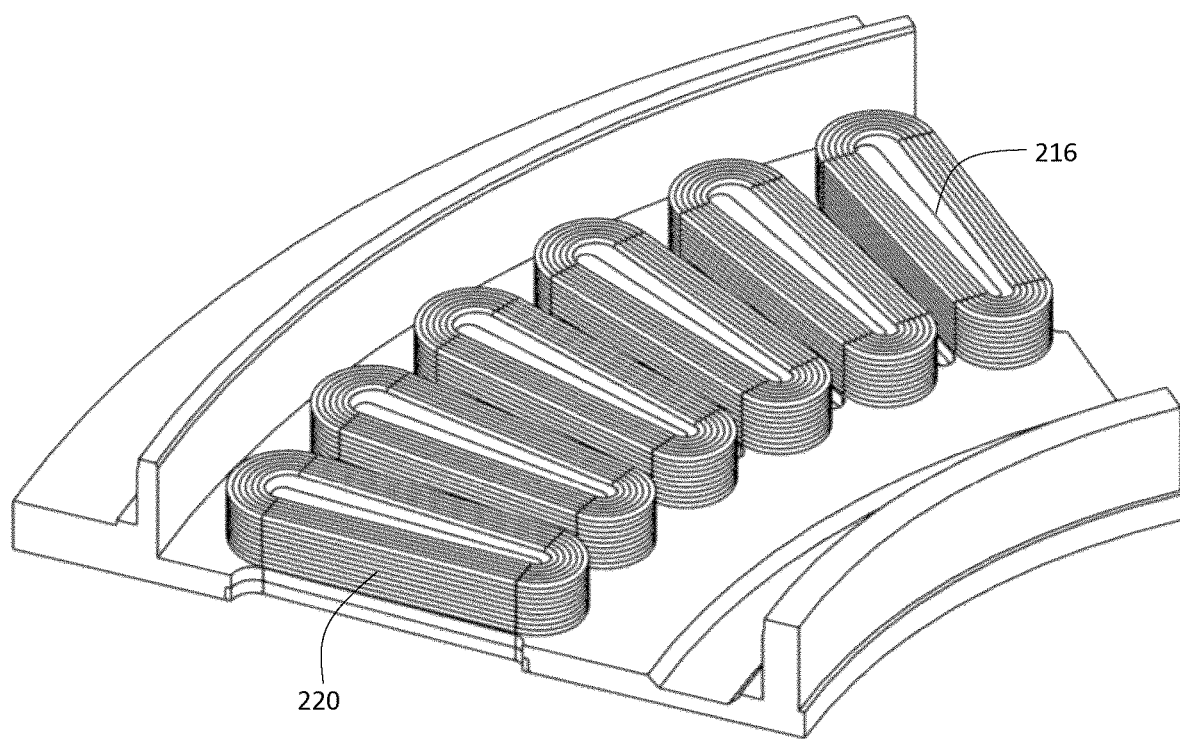
FIG. 42 is an isometric view of the collapsed top element and first insert of FIG. 40 with the needle winding completed.

The first insert 202 is inserted into the top element 200 (here the main stator body) to combine top element partial posts 206 and insert partial posts 212 provide combined posts 216 for winding. Needle winding using needle 218 is applied to these posts 216 to form coils 220 as shown in FIG. 41, using space available due to the inserts indicated by reference numeral 204 not yet being inserted. FIG. 42 shows the sector shown in FIG. 41 with the needle winding completed, the coils 220 being in place around the posts 216.

Although the top element 200 is described and shown as the main stator body in this embodiment, either the top element 200 or the first insert 202 could connect to radially inner or outer portions of the stator, so either or a combination could act as the main stator body.

Figure 43:
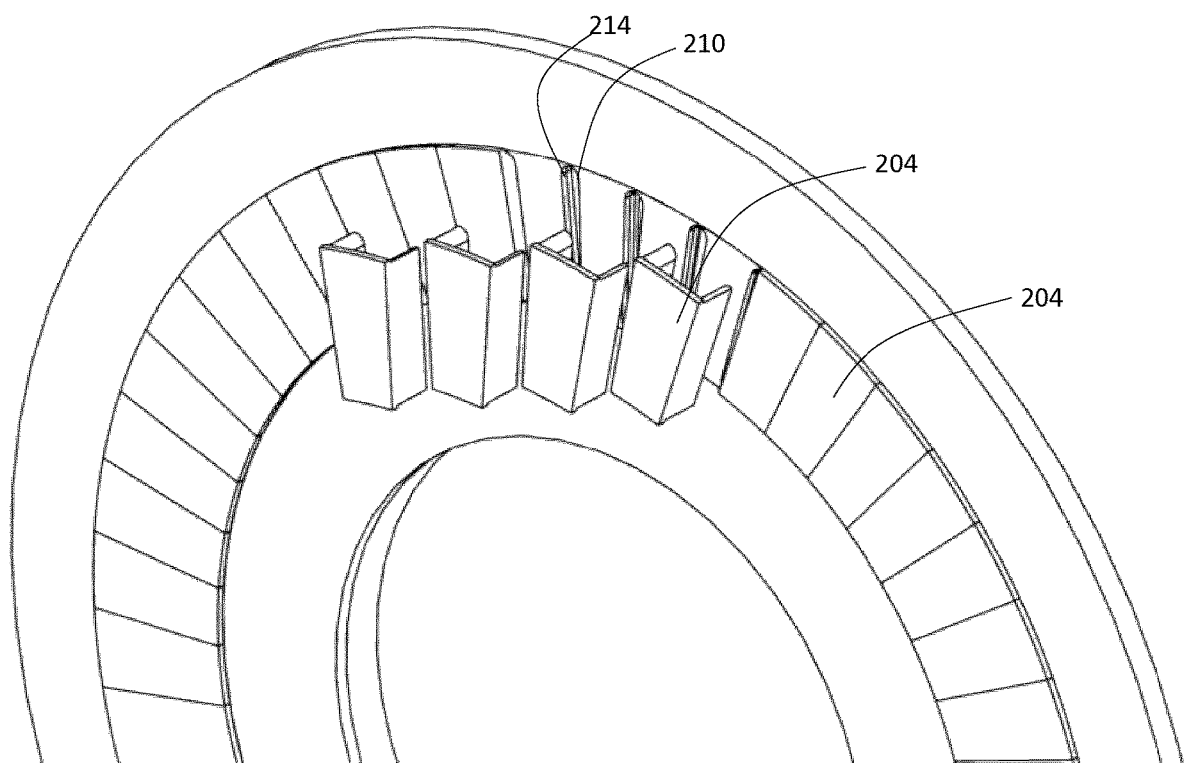
FIG. 43 is an isometric partially exploded view of smaller inserts being inserted into the collapsed top element and first insert of FIG. 40.

Once the winding has been completed, the smaller inserts indicated by reference numeral 204 may be added, inserted through gaps 210 and 214 in the top element 200 and the insert 202. First insert 202 may be a ring insert when in a circular embodiment of a stator (e.g. axial flux as shown in FIGS. 36-45 and 48-51). FIG. 43 shows the smaller inserts 204 being inserted into the gaps 210 and 214.

Figure 44:
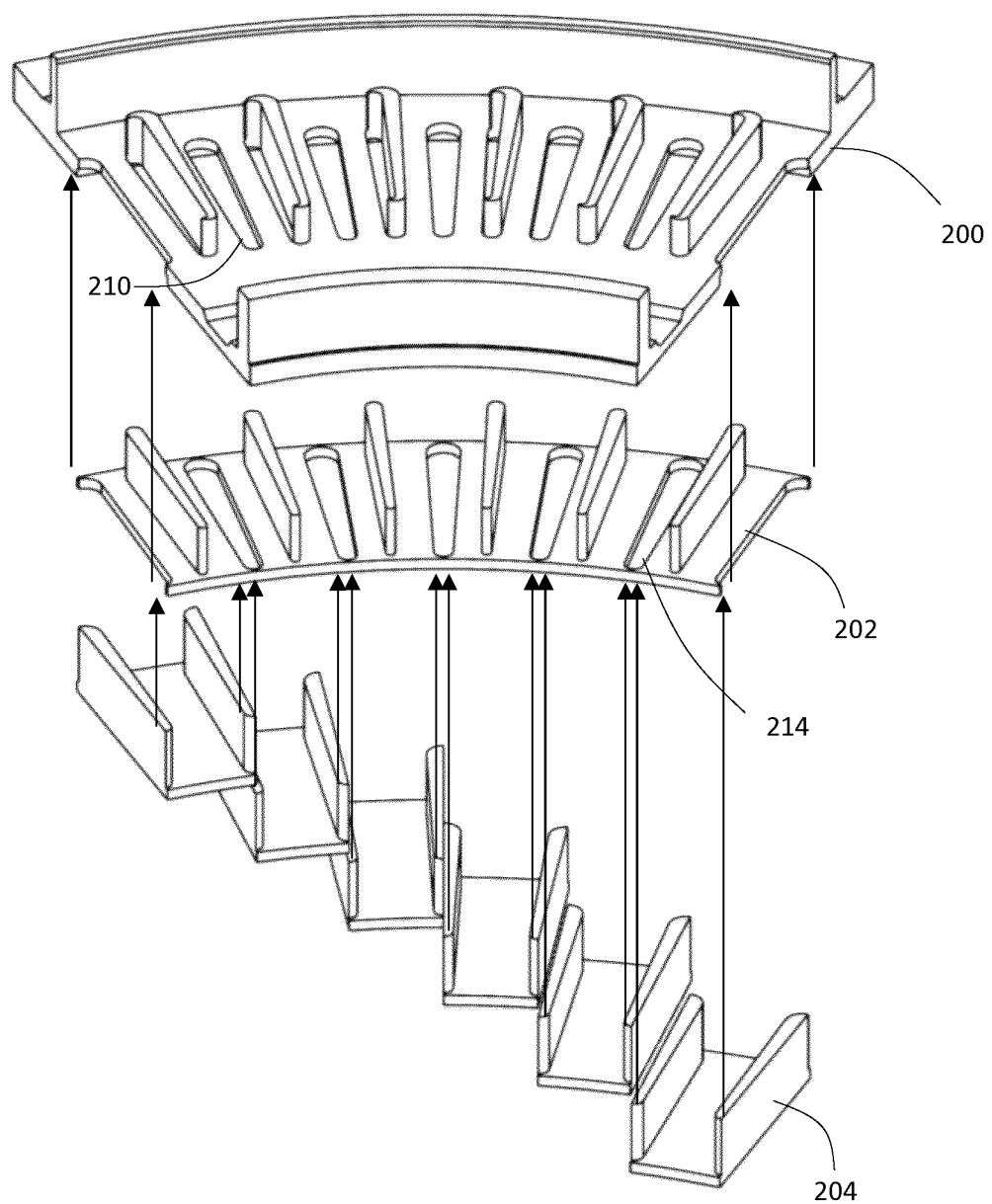
FIG. 44 is an exploded view of the top element, first insert, and smaller inserts of FIG. 43.

FIG. 44 is an exploded view of the embodiment of FIGS. 39-51 showing the order of component insertion, from top to bottom.

Figure 45:
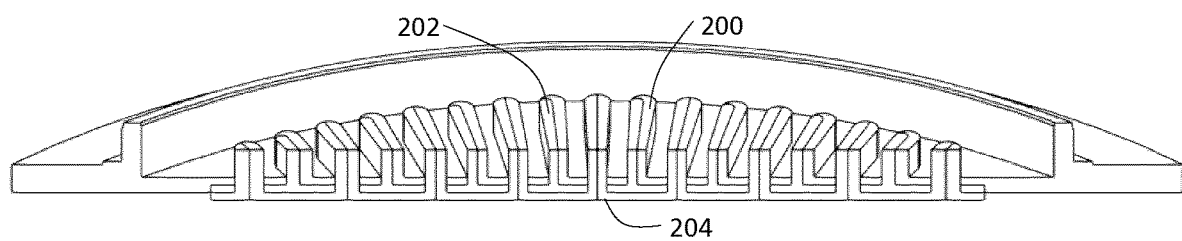
FIG. 45 is a section view of the stator of FIG. 43.

FIG. 45 is a section view offset from the center of the stator to show a stacking orientation of the components.

Figure 46:
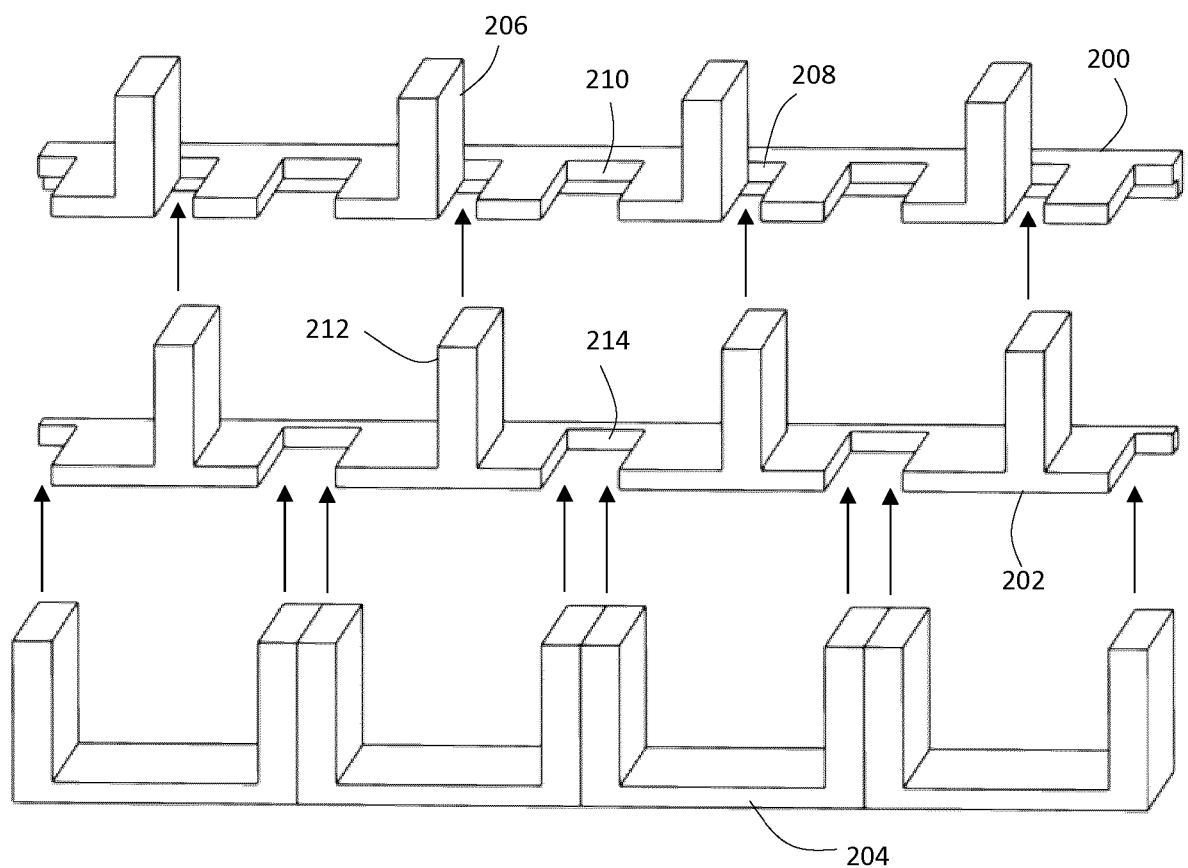
FIG. 46 is an exploded schematic view of a stator as in FIG. 43, shown in a linear configuration.
Figure 47:
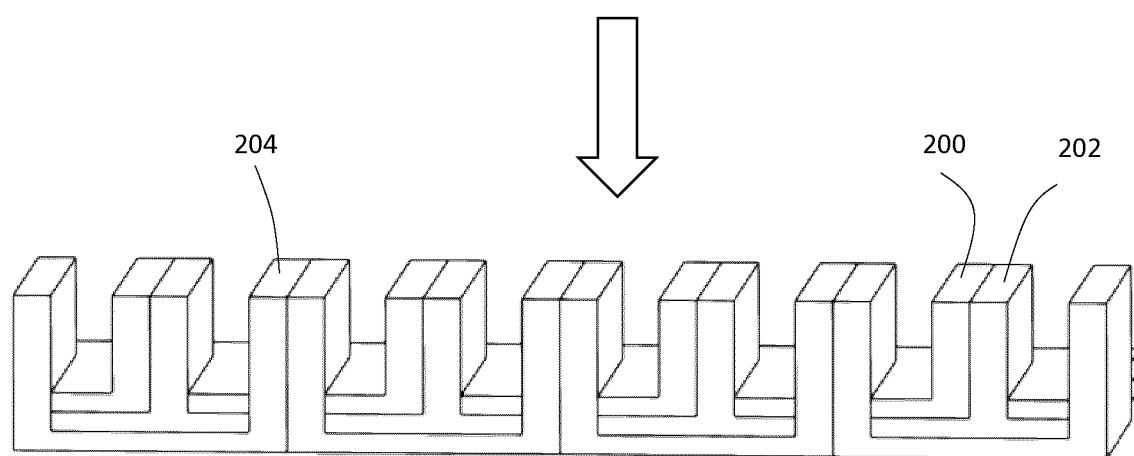
FIG. 47 is a collapsed version of the exploded view of FIG. 46.

FIGS. 46 and 47 are cross sections of an exemplary linear model to clarify stacking. They show the arrangement in schematic form, using a linearized arrangement for simplicity. FIG. 47 shows the collapse of the exploded arrangement shown in FIG. 46.

Figure 48:
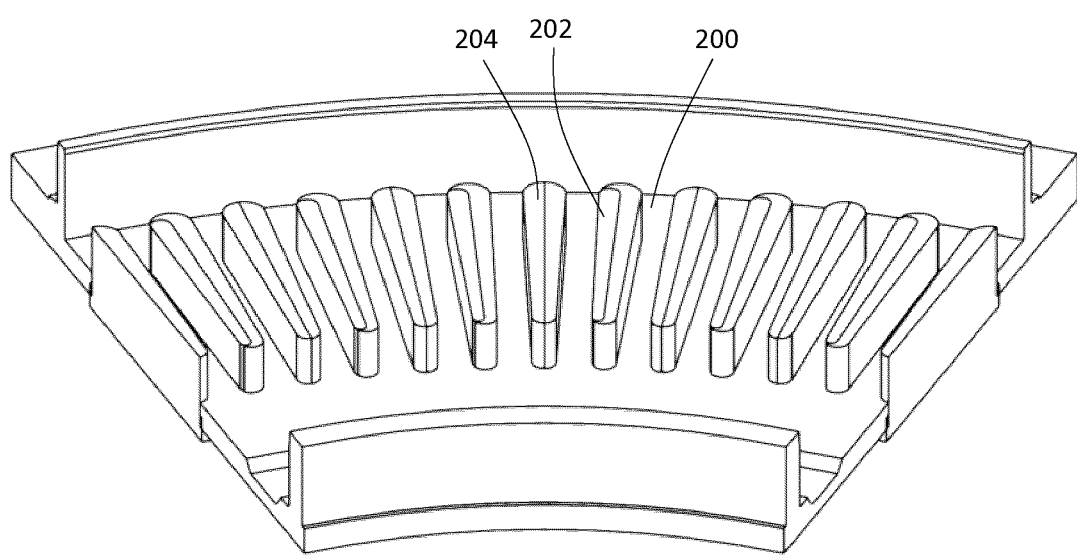
FIG. 48 is an isometric view of a sector of the stator of FIG. 43, with no coils shown.

FIG. 48 shows a 45 degree sector of a complete stator, not including conductors. Note that "conductors" here refers to the conductors that will carry drive or intended driven current when used as an electric machine, and does not imply that components shown are not conductive.

Figure 49:
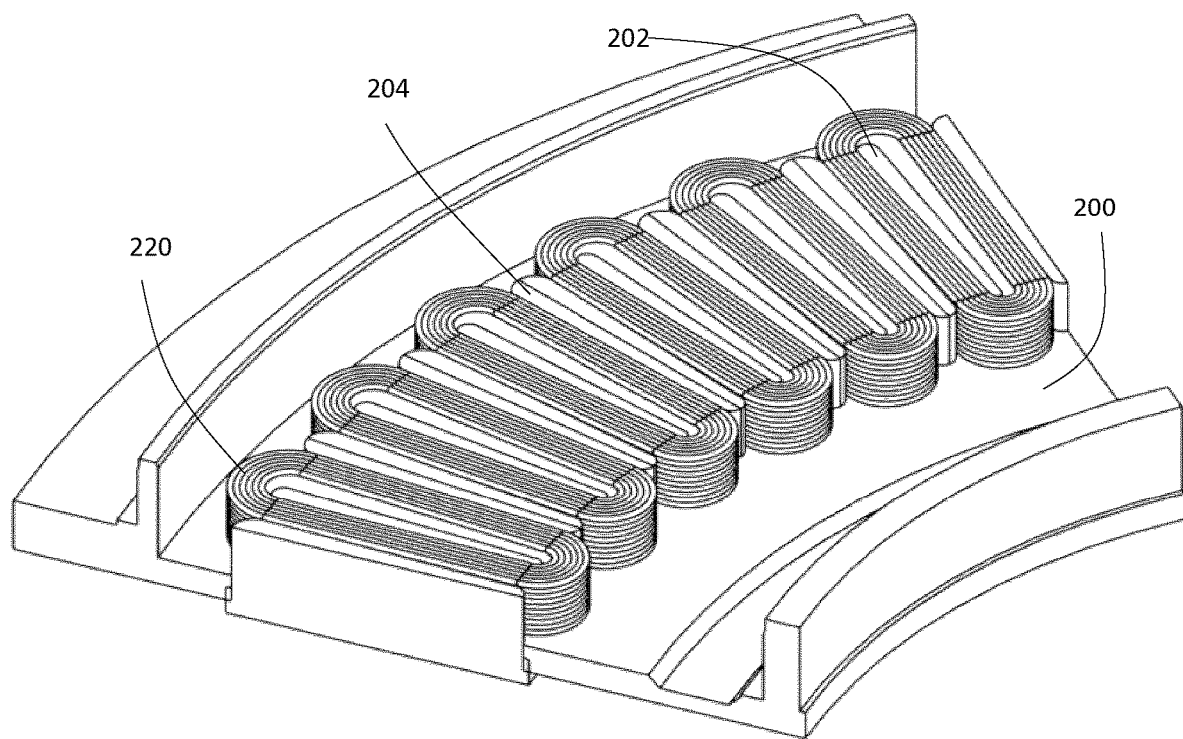
FIG. 49 is an isometric view of a sector of the stator of FIG. 43, with coils shown.

FIG. 49 shows a 45 degree sector of a complete stator including coils 220.

Figure 50:
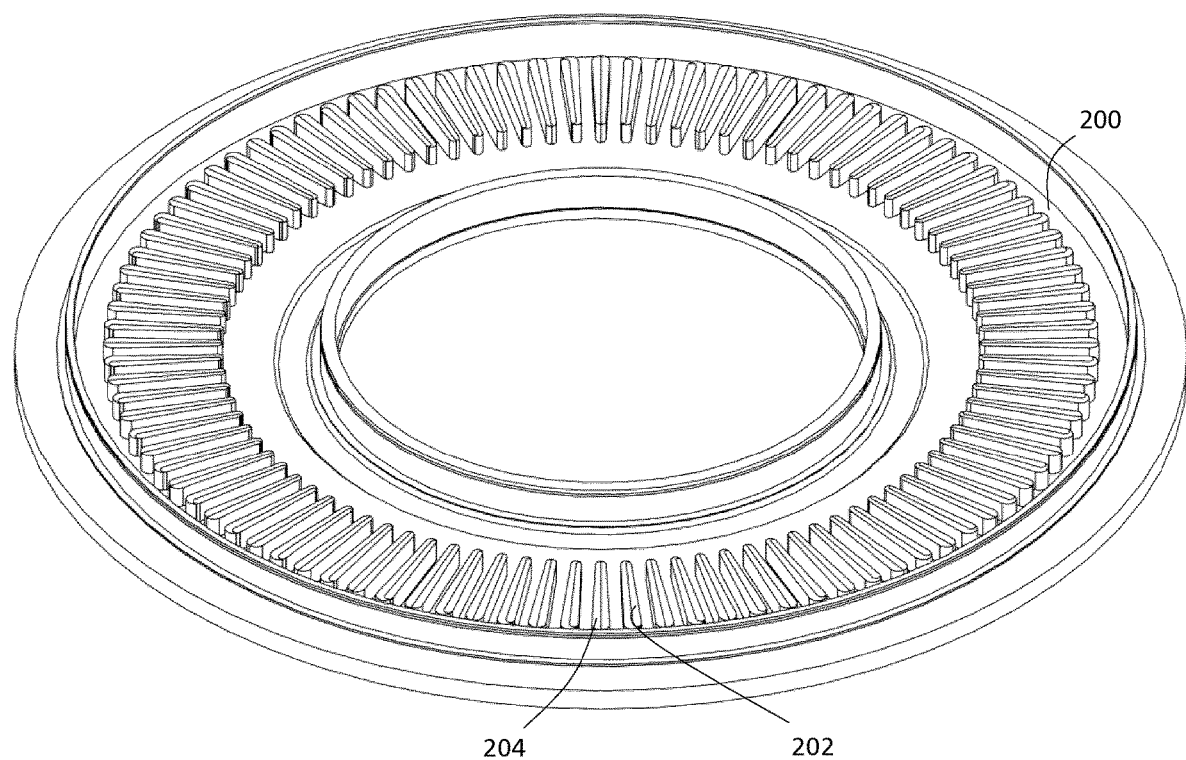
FIG. 50 is an isometric view of the stator of FIG. 43.

FIG. 50 shows the complete stator not including conductors.

Figure 51:
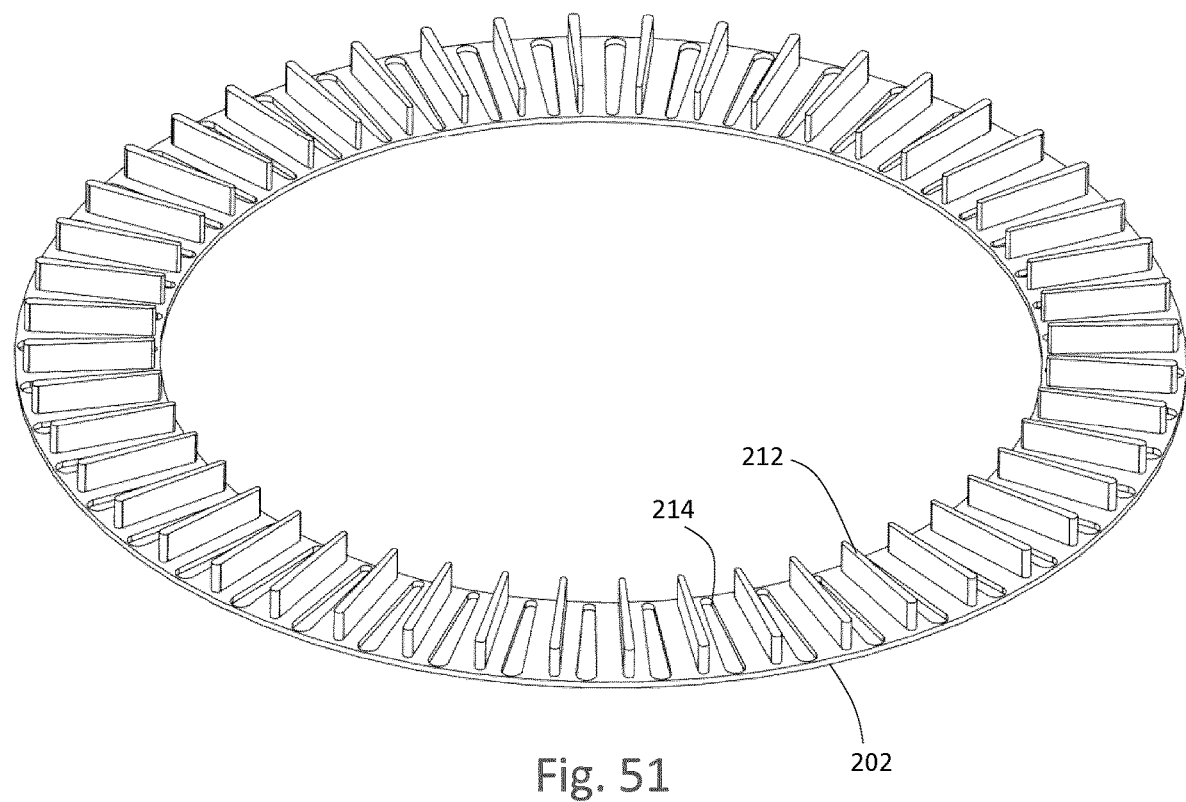
FIG. 51 is an isometric view of the first insert of the stator of FIGS. 39-50.

FIG. 51 shows a complete first insert 202, which is a ring insert in this embodiment.

Other inserts as disclosed above may also be used in place of the components described for this embodiment of FIGS. 39-51.

Figure 55:
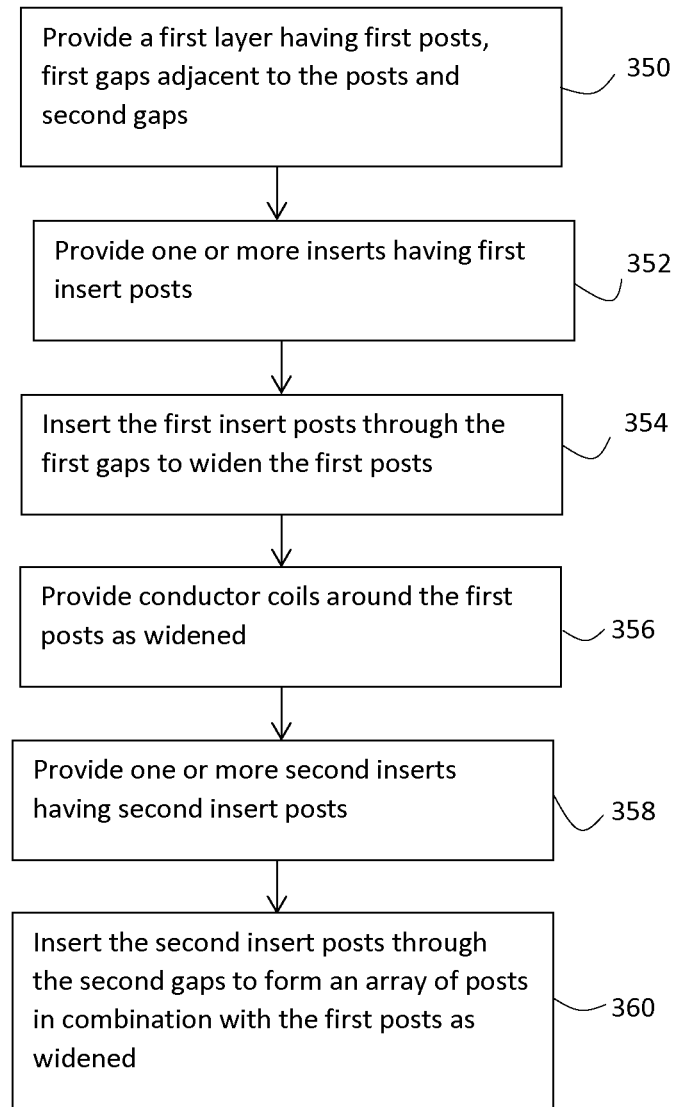
FIG. 55 is a flow diagram showing a method of providing a carrier with reduced eddy currents and greater space efficiency using inserts.

FIG. 55 shows a method of assembling a carrier for an electric machine. In step 350, a first layer is provided having plural first posts extending from the first layer, the first layer defining first gaps adjacent to the plural first posts and defining second gaps through the first layer intermediate between successive posts of the plural posts. In step 352, one or more inserts is provided having first insert posts configured to be inserted through the first gaps. In step 354, the first insert posts are inserted through the first gaps to combine with the plural first posts to widen the plural first posts. In step 356, a respective conductor coil is provided around each of the plural first posts, as widened by the one or more first insert posts. The respective conductor coil may be formed for example by winding with a needle, but could also be formed by any other method of forming a coil. In step 358, one or more second inserts is provided having second insert posts configured to be inserted through the second gaps. In step 360, the second insert posts are inserted through the second gaps to form an array of posts in combination with the plural first posts as widened by the one or more first inserts. The one or more second inserts may for example be plural second inserts, and in the step of inserting the second insert posts through the second gaps plural second insert posts may be inserted into each of the second gaps. The one or more first inserts may for example be a single insert having third gaps, and in the step of inserting the second insert posts through the second gaps the plural second insert posts may be inserted through the second gaps and third gaps.

In the claims, the word "comprising" is used in its inclusive sense and does not exclude other elements being present. The indefinite articles "a" and "an" before a claim feature do not exclude more than one of the feature being present. Each one of the individual features described here may be used in one or more embodiments and is not, by virtue only of being described here, to be construed as essential to all embodiments as defined by the claims.

The embodiments of the invention in which an exclusive property or privilege is claimed are defined as follows:

1. A carrier for an electric motor, the carrier comprising:
   one or more layers, each having plural post portions and being formed as a single piece;
   an additional layer having plural second post portions formed as a single piece, the additional layer defining gaps between the plural second post portions;
   the plural first post portions being inserted into the gaps between the plural second post portions to form plural posts in combination with the plural second post portions.

2. The carrier of claim 1 in which the additional layer comprises L-shaped portions, the plural second post portions being formed as upright portions of the L-shaped portions, the gaps between the plural second post portions being defined by the L-shaped portions.

3. The carrier of claim 2 in which the one or more layers are plural layers forming the carrier.

4. The carrier of claim 1 in which one of the one or more layers is a base layer having plural base post portions, which are the plurality first post portions, formed as a single piece.

5. The carrier of claim 1 further comprising spacers arranged between the layers.

6. The carrier of claim 1 in which the layers are shaped to form spaces between adjacent layers when assembled.

7. The carrier of claim 1 in which the gaps defined by each layer are sized substantially to match the post portions inserted into the gaps.

8. The carrier of claim 1 in which the one or more layers are plural layers forming the carrier.

9. The carrier of claim 1, wherein the one or more layers each comprises a backiron and the plural first post portions extend therefrom.

10. The carrier of claim 1, wherein the additional layer comprises a backiron and the plural second post portions extend therefrom.

11. The carrier of claim 10, wherein the gaps are formed in the backiron.

12. A carrier for an electric machine, the carrier comprising:
   a first layer, plural first posts extending from the first layer, the first layer defining gaps through the first layer adjacent to the plural first posts; and
   one or more inserts having plural insert posts formed as a single piece and configured to be inserted through the gaps to combine with the plural first posts to widen the plural first posts.

13. The carrier of claim 12, wherein the first layer comprises a backiron and the plural first posts extend therefrom.

14. The carrier of claim 13, wherein the gaps are formed in the backiron.

15. The carrier of claim 14, wherein the one or more inserts each comprises a backiron and the plural insert posts extend therefrom.

16. A carrier for an electric machine, the carrier comprising:
   a first layer, plural first posts extending from the first layer, the first layer defining first gaps through the first layer adjacent to the plural first posts and defining second gaps through the first layer intermediate between successive posts of the plural first posts;
   one or more first inserts having first insert posts configured to be inserted through the first gaps to combine with the plural first posts to widen the plural first posts; and
   one or more second inserts having second insert posts configured to be inserted through the second gaps to form an array of posts in combination with the plural first posts as widened by the one or more first inserts.

17. The carrier of claim 16 in which the one or more second inserts are plural second inserts, and plural second insert posts are configured to be inserted into each of the second gaps to form the array of posts in combination with the plural first posts as widened by the one or more first inserts.

18. The carrier of claim 17 in which the one or more first inserts are a single insert having third gaps, and the plural second insert posts are configured to be inserted through the second gaps and the third gaps.

19. The carrier of claim 16 in which the one or more first inserts are a single insert having third gaps, and the plural second insert posts are configured to be inserted through the second gaps and third gaps.

* * * * *